US012232152B2

(12) United States Patent
Kuang et al.

(10) Patent No.: US 12,232,152 B2
(45) Date of Patent: *Feb. 18, 2025

(54) WIDEBAND OPERATION IN AN UNLICENSED SPECTRUM WITH PLURAL SEPARATE FREQUENCY RANGES

(71) Applicant: Panasonic Intellectual Property Corporation of America, Torrance, CA (US)

(72) Inventors: Quan Kuang, Langen (DE); Hidetoshi Suzuki, Kanagawa (JP)

(73) Assignee: Panasonic Intellectual Property Corporation of America, Torrance, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/495,624

(22) Filed: Oct. 26, 2023

(65) Prior Publication Data

US 2024/0057142 A1    Feb. 15, 2024

Related U.S. Application Data

(63) Continuation of application No. 17/953,207, filed on Sep. 26, 2022, now Pat. No. 11,838,935, which is a
(Continued)

(30) Foreign Application Priority Data

Aug. 9, 2018 (EP) .................................... 18188359

(51) Int. Cl.
*H04W 72/04* (2023.01)
*H04W 24/08* (2009.01)
(Continued)

(52) U.S. Cl.
CPC .......... *H04W 72/53* (2023.01); *H04W 24/08* (2013.01); *H04W 72/0446* (2013.01); *H04W 72/0453* (2013.01); *H04W 72/23* (2023.01)

(58) Field of Classification Search
CPC ............. H04W 72/0493; H04W 24/08; H04W 72/042; H04W 72/0446; H04W 72/0453;
(Continued)

(56) References Cited

U.S. PATENT DOCUMENTS 10,021,677 B2    7/2018   Mallik et al.
11,490,392 B2   11/2022   Kuang et al.
(Continued)

FOREIGN PATENT DOCUMENTS

EP          3834332 B1      8/2023

OTHER PUBLICATIONS

3GPP TR 38.801 V2.0.0, "3rd Generation Partnership Project; Technical Specification Group Radio Access Network; Study on New Radio Access Technology; Radio Access Architecture and Interfaces (Release 14)," Mar. 2017, 90 pages.
(Continued)

*Primary Examiner* — Dady Chery
(74) *Attorney, Agent, or Firm* — Seed IP Law Group LLP

(57) ABSTRACT

The present disclosure relates to a mobile terminal and respective operation method. The mobile terminal comprises circuitry, which in operation monitors PDCCH candidates of a first search space set located in a designated first frequency range from the plurality of frequency ranges, and receives a DCI transmitted in the first search space set of the designated first frequency range. The received DCI includes an indication whether or not the mobile terminal is to skip monitoring some specific or all PDCCH candidates in at least one second search space set associated with at least one second frequency range from the plurality of frequency ranges. And
(Continued)

only if the indication in the received DCI does not indicate to skip monitoring the specific or all PDCCH candidates, the circuitry additionally monitors the specific or all PDCCH candidates associated with the at least one second frequency range for receiving a DCI thereon.

7 Claims, 5 Drawing Sheets

Related U.S. Application Data continuation of application No. 17/049,434, filed as application No. PCT/EP2019/056367 on Mar. 14, 2019, now Pat. No. 11,490,392.

(51) Int. Cl.
*H04W 72/0446* (2023.01)
*H04W 72/0453* (2023.01)
*H04W 72/23* (2023.01)
*H04W 72/53* (2023.01)

(58) Field of Classification Search
CPC . H04W 72/14; H04W 52/0219; H04W 16/14; H04W 48/16; H04W 74/0808; H04W 52/0229; H04W 52/0216; Y02D 30/70; H04L 5/0094; H04L 27/0006; H04L 5/0053; H04L 5/001
See application file for complete search history.

(56) References Cited

U.S. PATENT DOCUMENTS

| | | | | |
|---|---|---|---|---|
| 2016/0088597 | A1* | 3/2016 | Saito | H04L 5/001 370/329 |
| 2018/0092070 | A1* | 3/2018 | Liao | H04L 5/0053 |
| 2019/0116608 | A1* | 4/2019 | Kim | H04W 72/04 |
| 2019/0132109 | A1 | 5/2019 | Zhou et al. | |
| 2019/0223164 | A1 | 7/2019 | He et al. | |
| 2019/0297577 | A1 | 9/2019 | Lin et al. | |
| 2020/0288441 | A1 | 9/2020 | Park et al. | |

OTHER PUBLICATIONS

3GPP TS 38.211 V15.2.0, "3rd Generation Partnership Project; Technical Specification Group Radio Access Network; NR; Physical channels and modulation (Release 15)," Jun. 2018, 96 pages.
3GPP TS 38.212 V15.2.0, "3rd Generation Partnership Project; Technical Specification Group Radio Access Network; NR; Multiplexing and channel coding (Release 15)," Jun. 2018, 98 pages.
3GPP TS 38.213 V15.2.0, "3rd Generation Partnership Project; Technical Specification Group Radio Access Network; NR; Physical layer procedures for control (Release 15)," Jun. 2018, 99 pages.
3GPP TS 38.331 V15.2.1, "3rd Generation Partnership Project; Technical Specification Group Radio Access Network; NR; Radio Resource Control (RRC) protocol specification (Release 15)," Jun. 2018, 303 pages.
3GPP, "3rd Generation Partnership Project; Technical Specification Group Radio Access Network; NR; Multiplexing and channel coding (Release 15)," 3GPP TS 38.212 V1.2.1, Dec. 2017. (82 pages).
Apple Inc., "Group-common PDCCH for NR," R1-1708280, Agenda Item: 7.1.3.1.5, 3GPP TSG-RAN WG1 #89, Hangzhou, China, May 15-19, 2017. (4 pages).
Apple Inc., "Slot Format Indicator in Group-common PDCCH," R1-1720118, Agenda Item: 7.3.1.3, 3GPP TSG-RAN WG1 #91, Reno, US, Nov. 27-Dec. 1, 2017. (8 pages).
Ericsson, "Frame structure for NR-U," Tdoc R1-1806250, Agenda Item: 7.6.2, 3GPP TSG-RAN WG1 Meeting #93, Busan, Korea, May 21-25, 2018, 4 pages.
Ericsson, Qualcomm, Huawei, Alcatel-Lucent, "Study on Licensed-Assisted Access using LTE," RP-141646, Agenda Item: 14.1.1, 3GPP TSG RAN Meeting #65, Edinburgh, Scotland, Sep. 9-12, 2014, 8 pages.
ETSI, "Broadband Radio Access Networks (BRAN); 5 GHz high performance RLAN; Harmonized EN covering the essential requirements of article 3.2 of the R&TTE Directive," ETSI EN 301 893 V1.8.1, Mar. 2015, 93 pages.
Extended European Search Report, dated Jan. 24, 2019, for European Application No. 18188359.6, 12 pages.
Huawei, "Introduction of NR based access to unlicensed spectrum into 38.212," R1-1913631, 3GPP TSG-RAN WG1 Meeting #99, Reno, USA, Nov. 18-22, 2019. (58 pages).
Huawei, HiSilicon, "Numerology and wideband operation in NR unlicensed," R1-1803677, Agenda Item 7.6.5, 3GPP TSG RAN WG1 Meeting #92bis, Sanya, China, Apr. 16-20, 2018, 8 pages.
Huawei, HiSilicon, "User plane aspects for NR-based access to unlicensed spectrum," R2-1805817, Agenda item: 11.2, 3GPP TSG-RAN WG2 Meeting 101bis, Sanya, China, Apr. 16-20, 2018, 4 pages.
Indian Office Action, issued Sep. 30, 2022, for Indian Patent Application No. 202047056642. (5 pages).
Intel Corporation, "Group-common PDCCH: Contents," R1-1712573, Agenda item: 6.1.3.1.4.2, 3GPP TSG RAN WG1 Meeting #90, Prague, Czechia, Aug. 21-25, 2017. (6 pages).
Intel Corporation, "Open issues for wider bandwidth operations," R1-1710583, Agenda item: 5.1.7, 3GPP TSG RAN WG1 NR Ad-Hoc#2, Qingdao, P.R. China, Jun. 27-30, 2017. (7 pages).
Intel Corporation, "Potential enhancements to NR DL signals and channels for unlicensed operation," R1-1806542, Agenda Item: 7.6.3.1, 3GPP TSG RAN WG1 Meeting #93, Busan, Korea, May 21-25, 2018, 6 pages.
InterDigital Inc., "BWP operation in unlicensed spectrum," R1-1806968 (Update to R1-1804680), Agenda Item: 7.6.4.5, 3GPP RAN WG1 Meeting #93, Busan, Korea, May 21-25, 2018, 4 pages.
International Search Report, mailed May 17, 2019, for International Application No. PCT/EP2019/056367, 4 pages.
Nokia, Nokia Shanghai Bell, "On the remaining aspects of group-common PDCCH in NR," R1-1715751, Agenda item: 6.3.1.4, 3GPP TSG-RAN WG1 NRAH#3, Nagoya, Japan, Sep. 18-21, 2017. (4 pages).
NTT DOCOMO, Inc., "Other aspects of bandwidth Parts," R1-1800680, Agenda Item: 7.3.4.1, 3GPP TSG RAN WG1 Meeting AH 1801, Vancouver, Canada, Jan. 22-26, 2018. (4 pages).
NTT DOCOMO, Inc., "Remaining details on group-common PDCCH," R1-1720813, Agenda Item: 7.3.1.3, 3GPP TSG RAN WG1 Meeting 91, Reno, USA, Nov. 27-Dec. 1, 2017. (7 pages).
Qualcomm Incorporated, "Revised SID on NR-based Access to Unlicensed Spectrum," RP-172021, Agenda Item: 9.3.3, 3GPP TSG RAN Meeting #77, Sapporo, Japan, Sep. 11-14, 2017, 5 pages.
Samsung, "Downlink signal and channel design for NR-U," R1-1806759, Agenda item: 7.6.3.1, 3GPP TSG RAN WG1 Meeting #93, Busan, Korea, May 21-25, 2018. (5 pages).
Wilus Inc., "Consideration on Fallback Operation for Scheduled UEs," R1-1705848, Agenda item: 8.1.3.1.3, 3GPP TSG RAN WG1 Meeting #88bis, Spokane, USA, Apr. 3-7, 2017. (4 pages).
ZTE, "Contents for Group-common PDCCH," R1-1712445, Agenda Item: 6.1.3.1.4.2, 3GPP TSG RAN WG1 Meeting #90, Prague, Czechia, Aug. 21-25, 2017. (4 pages).
ZTE, "Structure consideration of Group-common PDCCH," R1-1712444, Agenda Item: 6.1.3.1.4.1, 3GPP TSG RAN WG1 Meeting #90, Prague, Czechia, Aug. 21-25, 2017. (4 pages).
Office Action, dated May 30, 2024, for Vietnamese Patent Application 1-2020-06787. (4 pages) (with English Translation).

* cited by examiner

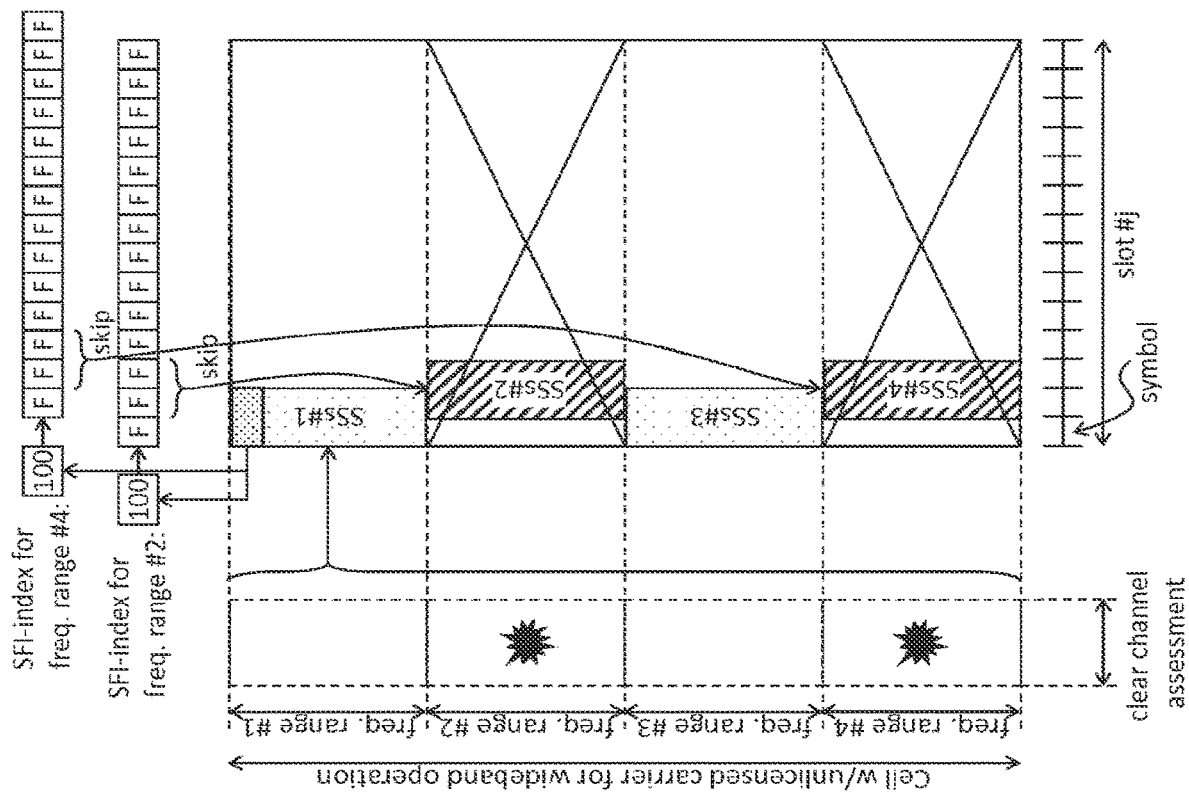

WIDEBAND OPERATION IN AN UNLICENSED SPECTRUM WITH PLURAL SEPARATE FREQUENCY RANGES

BACKGROUND

Technical Field

The present disclosure relates to a mobile terminal performing downlink receptions, or uplink transmissions in a wireless communication system. The system comprises a base station which is configured with a cell for wideband operation in an unlicensed spectrum. The unlicensed spectrum is divided into a plurality of frequency ranges, which permit separate downlink receptions and/or uplink transmissions of the mobile terminal.

Description of the Related Art

The 3 rd Generation Partnership Project (3GPP) has been developing technical specifications for the next generation cellular technology, which is also called fifth generation (5G) new radio (NR) over the past few years.

After initial studies, 3GPP approved a work item in March 2017 for NR specifications as part of Release 15. At the same meeting, 3GPP agreed to a proposal to accelerate the 5G schedule to complete non-standalone (NSA) NR by December 2017, while standalone (SA) NR was scheduled to be completed by June 2018.

In NSA operation, long-term evolution (LTE) is used for initial access and mobility handling while the SA version can be deployed independently from LTE. A major milestone was reached in December 2017 with the approval of the NSA NR specifications while the SA version was completed in June 2018.

The last step for Rel-15 is a late drop that will be completed by December 2018. The late drop will include more architecture options, e.g., the possibility to connect 5G NodeBs (gNB) to the evolved packet core (EPC) and operating NR and LTE in multi-connectivity mode wherein NR is the master node, and LTE is the secondary node.

One objective of 5G new radio (NR) is to provide a single technical framework addressing a variety of usage scenarios including enhanced mobile broadband (eMBB), ultra-reliable low-latency communications (URLLC), and massive machine type communication (mMTC).

For example, eMBB deployment scenarios may include indoor hotspot, dense urban, rural, urban macro and high speed; URLLC deployment scenarios may include industrial control systems, mobile health care (remote monitoring, diagnosis and treatment), real time control of vehicles, wide area monitoring and control systems for smart grids; mMTC may include the scenarios with large number of devices with non-time critical data transfers such as smart wearables and sensor networks.

As summarized in one of the technical reports for the NR study item (3GPP TSG TR 38.801 v2.0.0, "*Study on New Radio Access Technology; Radio Access Architecture and Interfaces*," March 2017), the fundamental physical layer signal waveform will be based on Orthogonal Frequency Division Multiplexing (OFDM). For both downlink and uplink, OFDM with cyclic prefix (CP-OFDM) based waveform is supported. Discrete Fourier Transformation (DFT) spread OFDM (DFT-S-OFDM) based waveform is also supported, complementary to CP-OFDM waveform at least for eMBB uplink for up to 40 GHz.

The term "downlink" refers to communication from a higher node to a lower node (e.g., from a base station to a relay node or to a UE, from a relay node to a UE, or the like). The term "uplink" refers to communication from a lower node to the higher node (e.g., from a UE to a relay node or to a base station, from a relay node to a base station, or the like). The term "sidelink" refers to communication between nodes at the same level (e.g., between two UEs, or between two relay nodes, or between two base stations).

BRIEF SUMMARY

One non-limiting and exemplary embodiment improves the energy efficiency of the mobile terminal during wideband operation in an unlicensed spectrum. Wideband operation in an unlicensed spectrum requires Listen-Before-Talk operations to avoid interference between devices of coexisting radio access technologies. Thus, it cannot be ensured that the entire unlicensed spectrum is continuously available for the wideband operation to a cellular radio access technology.

Beneficially, this uncertainty has only a limited impact upon the operation of a base station of such cellular radio access technology. A base station may quickly adapt its scheduling decisions to the results of the Listen-Before-Talk operations. For example, a scheduling decision may restrict downlink or uplink data transmissions to only some of plural separate frequency ranges in the unlicensed spectrum.

This is however different for mobile terminals of such cellular radio access technology. Regardless of the scheduling decision, mobile terminals are always required to monitor all search space sets (via blind decoding) for receiving the scheduling decisions. Even if the scheduling decision is to avoid transmissions over entire frequency ranges, the mobile terminal is still obliged to monitor the according search space sets.

In order to release the mobile terminal from its obligation to monitor all search space sets, the present disclosure proposes transmitting an indication to the mobile terminals that indicates whether or not to skip monitoring individual search space sets. Since the mobile terminal receives this indication before the monitoring is carried out, this improves the energy efficiency of the mobile terminal.

In one general aspect, the techniques disclosed here feature a mobile terminal for performing downlink receptions or uplink transmissions in a wireless communication system comprising a base station configured with a cell for wideband operation in an unlicensed spectrum with a carrier bandwidth which is divided into a plurality of frequency ranges.

The mobile terminal comprises a processor and a transceiver. The processor, in operation, monitors physical downlink control channel, PDCCH, candidates of a first search space set located in a designated first frequency range from the plurality of frequency ranges.

The transceiver, in operation, receives a downlink control information, DCI, transmitted in the first search space set of the designated first frequency range, wherein the received DCI includes an indication whether or not the mobile terminal is to skip monitoring some specific or all PDCCH candidates in at least one second search space set associated with at least one second frequency range from the plurality of frequency ranges.

And, only if the indication in the received DCI does not indicate to skip monitoring the specific or all PDCCH candidates in the at least one second search space set, the processor, in operation, additionally, monitors the specific or all PDCCH candidates associated with the at least one second frequency range for receiving a DCI including a downlink assignment which is assigning resources for downlink receptions or an uplink grant, which is assigning resources for uplink transmissions.

It should be noted that general or specific embodiments may be implemented as a system, a method, an integrated circuit, a computer program, a storage medium, or any selective combination thereof.

Additional benefits and advantages of the disclosed embodiments will be apparent from the specification and figures. The benefits and/or advantages may be individually obtained by the various embodiments and features of the specification and drawings, which need not all be provided in order to obtain one or more of such benefits and/or advantages.

BRIEF DESCRIPTION OF THE SEVERAL VIEWS OF THE DRAWINGS

FIG. 5 illustrates a third example for the specific implementation of the wideband operation in an unlicensed spectrum in a 3GPP NR deployment scenario.

Figure 1:
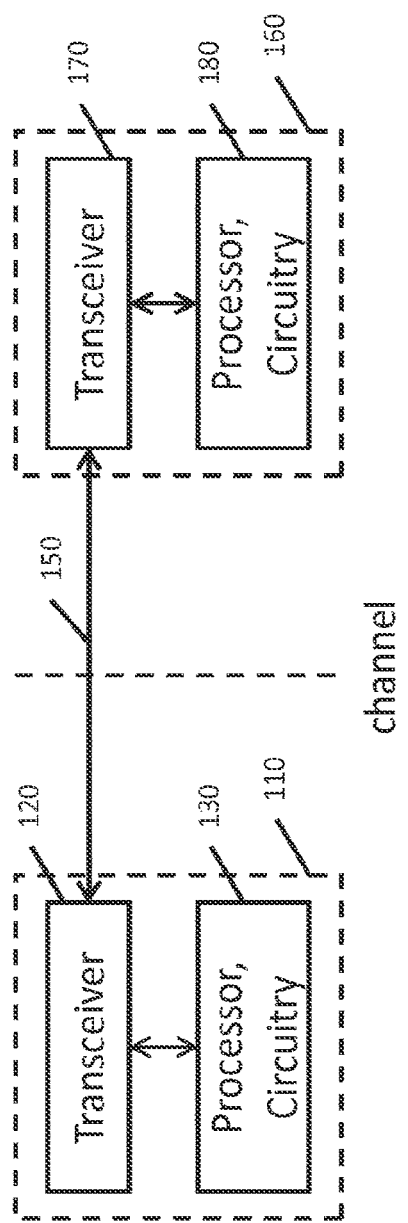
FIG. 1 depicts a block diagram of a mobile terminal, and a base station in a wireless communication system.

In 3GPP NR, the operation in unlicensed spectrum (termed NR-U) has greatly improved over mechanisms known from the former versions of, for example, the LTE standards. In its efforts to standardize this operation, 3GPP has devoted a study item, i.e., 3GPP RP-172021 to this topic, which in its entirety is incorporated herein by reference. For example, in section 4.1 of this document, the different architectural scenarios are discussed, including NR-based Licensed Assisted Access (LAA), and an NR-based stand-alone cell operation in unlicensed spectrum.

DETAILED DESCRIPTION

Overview

As defined in Release-15, all Release-15 NR UEs in licensed band operation will be able to support 100 MHz bandwidth for sub-6 GHz (e.g., bands in 450 MHz-6 GHz)), and 400 MHz bandwidth for millimeter wave (e.g., bands in 24.25 GHz-52.6 GHz). In addition, there are several wide unlicensed frequency bands available, which can be made use of in order to satisfy the everlasting demand for faster, more responsive mobile broadband. Hence, wideband operation in unlicensed spectrum is one of the key building blocks for NR-U.

In order to facilitate such wideband operations, two different scenarios are currently discussed to improve the spectral efficiency: firstly, carrier aggregation (CA) and secondly, a wideband carrier. In the carrier aggregation scenario, the bandwidth of the wideband spectrum is divided into component carriers, which are spaced apart with guard-bands in-between. Plural component carriers can then be aggregated for data transmission and/or reception. In the wideband carrier scenario, the wideband spectrum is treated as a uniform set of resources. Merely for the purpose of a lower scheduling overhead, this wideband carrier may include dedicated resources which serve e.g., exclusively as control channels. Importantly, without any division into different component carriers, the (entire) wideband spectrum can be made use of for data transmissions and/or receptions without a separate aggregation operation.

Operation in Unlicensed Spectrum

As already considered in 3GPP RP-141646, some regions in the world require unlicensed technologies to abide to certain regulations, e.g., Listen-Before-Talk (LBT). Fair coexistence between cellular operations and other technologies such as Wi-Fi, in its different versions, as well as between cellular operators themselves, is necessary. Even in countries without LBT, regulatory requirements exist to attempt to minimize interference with other users of the unlicensed spectrum. However, it is not enough to minimize interference simply for regulatory aspects. It is thus, essential to ensure that a NR-based unlicensed access wideband system operates as a "good neighbor" towards all forms of legacy systems.

The Listen-Before-Talk (LBT) procedure is defined as a mechanism by which an equipment applies a clear channel assessment (CCA) check before using the channel. The CCA utilizes at least energy detection to determine the presence or absence of other signals on a channel in order to determine if a channel is occupied or clear, respectively. European and Japanese regulations, for instance, mandate the usage of LBT in the unlicensed bands. Apart from regulatory requirements, this carrier sensing via LBT is one way for fair sharing of the unlicensed spectrum, and hence it is considered to be a vital feature for fair and friendly operation in the unlicensed spectrum in a single global solution framework.

Following this European regulation regarding LBT, devices have to perform a clearClear Channel Assessment (CCA) before occupying the radio channel with a data transmission. It is only allowed to initiate a transmission on the unlicensed channel after detecting the channel as free based e.g., on energy detection. In particular, the equipment has to observe the channel for a certain minimum time (e.g., for Europe 20 μs, see ETSI 301 893, under clause 4.8.3) during the CCA.

The channel is considered occupied if the detected energy level exceeds a configured CCA threshold (e.g., for Europe, −73 dBm/MHz, see ETSI 301 893, under clause 4.8.3), and conversely is considered to be free if the detected power level is below the configured CCA threshold. If the channel is determined as being occupied, it shall not transmit on that channel during the next Fixed Frame Period. If the channel is classified as free, the device is allowed to transmit immediately. The maximum transmit duration is restricted in order to facilitate fair resource sharing with other devices operating on the same band.

RAN1 #92Bis Agreement on Listen-Before-Talk for NR-U

To ensure an efficient implementation of the Listen-Before-Talk (LBT) operation, certain restrictions have been agreed on for NR-based unlicensed access wideband systems. As a baseline for study it is agreed that: if an absence of Wi-Fi cannot be guaranteed (e.g., by regulation) in the band (sub-7 GHz) where NR-U is operating, the NR-U operating bandwidth is an integer multiple of 20 MHz. At least for the band where absence of Wi-Fi cannot be guaranteed (e.g., by regulation), LBT can be performed in units of 20 MHz. Nevertheless, for further study (FFS) remains: details on how to perform LBT for as single carrier with bandwidth greater than 20 MHz, i.e., integer multiples of 20 MHz.

Present Disclosure

Considering the above, the present disclosure has been conceived with the understanding that the wideband operation in NR-U can be further improved. Particularly, the agreement to restrict the Listen-Before-Talk operation to units of 20 MHz, resulting in an NR unlicensed spectrum with an operating bandwidth of an integer multiple of 20 MHz, reduces the flexibility in utilizing the unlicensed spectrum.

For example, the present disclosure contemplates a scenario where only one or two of the Listen-Before-Talk operations have failed in the clear channel assessment (CCA) in the respective 20 MHz units. Then, the "good neighbor" criterion would require the NR-based unlicensed access wideband system to ensure that at least over those 20 MHz units, no transmissions are carried out. An absence of such transmissions is, however, not immediately apparent to the UE (also termed "mobile terminal"), which may potentially be configured to expect signaling on resources located therein.

In more detail, the NR-U system design assumes that the gNB (also termed "gNodeB" or "base station") is responsible to ensure the "good neighbor" criterion, at least for downlink. In this respect, it is the gNB which is performing the Listen-Before-Talk operations at least for the transmission of downlink control information via PDCCH and downlink user data via PDSCH. Once it has detected a failure in the Clear Channel Assessment, gNB can prepare PDCCH and PDSCH correspondingly to avoid the respective 20 MHz unit. However, this may impose tight processing requirement for the gNB.

To relax the PDCCH and PDSCH processing timeline, gNB can prepare PDCCH and PDSCH before knowing the LBT outcome. Then some prepared PDCCH and PDSCH will be dropped (e.g., punctured) according to the LBT result.

The absence of any scheduling on resources located in the respective 20 MHz units, does however, not release the UE from its obligation to monitor the according control information. Particularly, irrespective of the presence or absence (i.e., due to puncturing) of transmissions in the respective 20 MHz units, the UE will still monitor physical downlink control channel, PDCCH, candidates in Search Space sets (also termed "SSs") associated with resources located therein.

The monitoring requirement originates from the specification of search space sets in NR.

Search space sets are defined in NR through the technical specification 3GPP TS 38.213 version V15.2.0, published June 2018 on the website 3gpp.org, and titled, "*NR; Physical layer procedures for control (Release 15),*" which in its entirety is incorporated herein by reference. Particular reference is made to section 10 titled "*UE procedures for receiving control information*" and section 11.1 UE procedure for determining slot format thereof.

Therein, it is prescribed that a UE monitors a set of PDCCH candidates in one or more control resource sets (CORESETs) on the active DL bandwidth-part (BWP) on each activated serving cell configured with PDCCH monitoring according to corresponding search space sets where monitoring implies decoding each PDCCH candidate according to the monitored DCI formats.

In section 10.1 titled, "*UE procedure for determining physical downlink control channel assignment*" of 3GPP TS 38.213 (referenced above) the control resource set is defined as follows: For each DL BWP configured to a UE in a serving cell, a UE can be provided by higher layer signaling with control resource sets (CORESETs). For each control resource set (CORESET), the UE is provided the following by higher layer parameter ControlResourceSet:

a control resource set index p, $0 \leq p < 12$, by higher layer parameter controlResourceSetId;

a DM-RS scrambling sequence initialization value by higher layer parameter pdcch-DMRS-ScramblingID;

a precoder granularity for a number of REGs in the frequency domain where the UE can assume use of a same DM-RS precoder by higher layer parameter precoderGranularity;

a number of consecutive symbols provided by higher layer parameter duration;

a set of resource blocks provided by higher layer parameter frequencyDomainResources;

CCE-to-REG mapping parameters provided by higher layer parameter cce-REG-MappingType;

an antenna port quasi co-location, from a set of antenna port quasi co-locations provided by higher layer parameter TCI-StatesPDCCH, indicating quasi co-location information of the DM-RS antenna port for PDCCH reception;

an indication for a presence or absence of a transmission configuration indication (TCI) field for DCI format 1_1 transmitted by a PDCCH in control resource set p, by higher layer parameter TCI-PresentInDCI.

This definition is equivalent to what is disclosed in the technical specification 3GPP TS 38.331 in version V15.2.1 published June 2018 on the website 3gpp.org, and titled, "*NR; Radio Resource Control (RRC) protocol specification (Release 15),*" which in its entirety is incorporated herein by reference. Particular reference is made to section 6.3.2 titled, "*Radio resource control information element,*" thereof, which defines the control Resource Set (CORESET) information element, termed "ControlResourceSet IE."

Importantly, the ControlResourceSet IE includes the parameter frequencyDomainResources, which specifies the frequency domain resources for the CORESET. Each bit corresponds to a group of 6 RBs, with grouping starting from PRB 0, which is fully contained in the bandwidth part within which the CORESET is configured.

The most significant bit corresponds to the group of lowest frequency, which is fully contained in the bandwidth part within which the CORESET is configured, and each next subsequent lower significance bit corresponds to the next lowest frequency group fully contained within the bandwidth part within which the CORESET is configured, if any.

Bits corresponding to a group not fully contained within the bandwidth part within which the CORESET is configured are set to zero. Corresponds to L1 parameter 'CORESET-freq-dom' (see 3GPP TS 38.211, section 7.3.2.2).

Additionally, the monitoring of PDCCH candidates is defined to be according to corresponding search space sets. A search space set can be a common search space set or a UE-specific search space set. A UE monitors PDCCH candidates in one or more of the following search spaces sets a Type0-PDCCH common search space set configured by searchSpaceZero in MasterInformationBlock or by searchSpaceSIB1 in PDCCH-ConfigCommon for a DCI format with CRC scrambled by a SI-RNTI on a primary cell;

a Type0A-PDCCH common search space set configured by searchSpace-OSI in PDCCH-ConfigCommon for a DCI format with CRC scrambled by a SI-RNTI on a primary cell;

a Type1-PDCCH common search space set configured by ra-SearchSpace in PDCCH-ConfigCommon for a DCI format with CRC scrambled by a RA-RNTI, or a TC-RNTI on a primary cell;

a Type2-PDCCH common search space set configured by pagingSearchSpace in PDCCH-ConfigCommon for a DCI format with CRC scrambled by a P-RNTI on a primary cell;

a Type3-PDCCH common search space set configured by SearchSpace in PDCCH-Config with searchSpaceType=common for DCI formats with CRC scrambled by INT-RNTI, or SFI-RNTI, or TPC-PUSCH-RNTI, or TPC-PUCCH-RNTI, or TPC-SRS-RNTI and, only for the primary cell, C-RNTI, or CS-RNTI(s); and a UE-specific search space set configured by SearchSpace in PDCCH-Config with searchSpaceType=ue-Specific for DCI formats with CRC scrambled by C-RNTI, or CS-RNTI(s).

Particularly, section 10.1 titled, "*UE procedure for determining physical downlink control channel assignment*" of 3GPP TS 38.213 (referenced above) provides for the following mechanism for configuring search space sets in the UE.

For each DL BWP configured to a UE in a serving cell, the UE is provided by higher layers with S≤10 search space sets where, for each search space set from the S search space sets, the UE is provided the following by higher layer parameter SearchSpace:

a search space set index s, 0≤s<40, by higher layer parameter searchSpaceId;

an association between the search space set s and a control resource set p by higher layer parameter controlResourceSetId;

a PDCCH monitoring periodicity of $k_{p,s}$ slots and a PDCCH monitoring offset of $o_{p,s}$ slots, by higher layer parameter monitoringSlotPeriodicityAndOffset;

a PDCCH monitoring pattern within a slot, indicating first symbol(s) of the control resource set within a slot for PDCCH monitoring, by higher layer parameter monitoringSymbolsWithinSlot;

a number of PDCCH candidates $M_{p,s}^{(L)}$ per CCE aggregation level L by higher layer parameters aggregationLevel1, aggregationLevel2, aggregationLevel4, aggregationLevel8, and aggregationLevel16, for CCE aggregation level 1, CCE aggregation level 2, CCE aggregation level 4, CCE aggregation level 8, and CCE aggregation level 16, respectively;

an indication that search space set S is either a common search space set or a UE-specific search space set by higher layer parameter searchSpaceType;

if search space set S is a common search space set,
an indication by higher layer parameter dci-Format0-0-AndFormat1-0 to monitor PDCCH candidates for DCI format 0_0 and DCI format 1_0 with CRC scrambled by a C-RNTI or a CS-RNTI (if configured), RA-RNTI, TC-RNTI, P-RNTI, SI-RNTI;

an indication by higher layer parameter dci-Format2-0 to monitor one or two PDCCH candidates for DCI format 2_0 and a corresponding CCE aggregation level;

an indication by higher layer parameter dci-Format2-1 to monitor PDCCH candidates for DCI format 2_1;

an indication by higher layer parameter dci-Format2-2 to monitor PDCCH candidates for DCI format 2_2;

an indication by higher layer parameter dci-Format2-3 to monitor PDCCH candidates for DCI format 2_3;

if search space set is a UE-specific search space set, an indication by higher layer parameter dci-Formats to monitor PDCCH candidate either for DCI format 0_0 and DCI format 1_0, or for DCI format 0_1 and DCI format 1_1.

This definition is equivalent to what is disclosed in the technical specification 3GPP TS 38.331 (referenced above) in section 6.3.2 titled, "*Radio resource control information element*" specifies, thereof, which defines the Search Space information element, termed "SearchSpace IE."

For ease of reference, it shall be emphasized that the "SearchSpace IE" includes a field which is termed "controlResourceSetId" which defines the CORESET applicable for this SearchSpace. Value 0 identifies the common CORESET configured in MIB and in ServingCellConfigCommon Values 1..maxNrofControlResourceSets-1 identify CORESETs configured by dedicated signaling.

Importantly, the "SearchSpace IE" also includes a field which is termed "monitoringSymbolsWithinSlot" which defines symbols for PDCCH monitoring in the slots configured for PDCCH monitoring (see monitoringSlotPeriodicityAndOffset).

The most significant (left) bit represents the first OFDM symbol in a slot. The least significant (right) bit represents the last symbol. Corresponds to L1 parameter 'Monitoring-symbols-PDCCH-within-slot' (see 3GPP TS 38.213, section 10, referenced above).

In other words, each search space set is defined in frequency domain through its reference to "controlResourceSetId" with "frequencyDomainResources," whereas in the time domain, each search space set is defined to start at the symbol specified with "monitoringSymbolsWithinSlot" and for a symbol duration specified through its reference to "controlResourceSetId" in the filed "duration."

In this context, reference is also made to sub-section 11.1.1 titled "*UE procedure for determining slot format,*" of 3GPP TS 38.213 which discloses the following:

The UE is also provided in one or more serving cells with a configuration for a search space set s and a corresponding control resource set p for monitoring $M_{p,s}^{(L_{SFI})}$ PDCCH candidates for DCI format 2_0 with a CCE aggregation level of $L_{SFI}$ CCEs as described in sub-section 10.1 of 3GPP TS 38.213. The $M_{p,s}^{(L_{SFI})}$ PDCCH candidates are the first $M_{p,s}^{(L_{SFI})}$ PDCCH candidates for CCE aggregation level $L_{SFI}$ for search space set s in control resource set p.

For each serving cell in the set of serving cells, the UE can be provided:

an identity of the serving cell by higher layer parameter servingCellId a location of a SFI-index field in DCI format 2_0 by higher layer parameter positionInDCI a set of slot format combinations by higher layer parameter slotFormatCombinations, where each slot format combination in the set of slot format combinations includes one or more slot formats indicated by a respective higher layer parameter slotFormats for the slot format combination, and a mapping for the slot format combination provided by slotFormats to a corresponding SFI-index field value in DCI format 2_0 provided by higher layer parameter slotFormatCombinationId for unpaired spectrum operation, a reference subcarrier spacing $\mu_{SFI}$ by higher layer parameter subcarrierSpacing and, when a supplementary UL carrier is configured for the serving cell, a reference subcarrier spacing $\mu_{SFI,SUL}$ by higher layer parameter subcarrierSpacing2 for the supplementary UL carrier for paired spectrum operation, a reference subcarrier spacing $\mu_{SFI, DL}$ for a DL BWP by higher layer parameter subcarrierSpacing and a reference subcarrier spacing $\mu_{SFI, UL}$ for an UL BWP by higher layer parameter subcarrierSpacing2.

Importantly, the higher layer parameter slotFormatCombinations is defined in 3GPP TS 38.331 (referenced above) as a list with SlotFormatCombinations. Each SlotFormatCombination comprises of one or more SlotFormats (see 3GPP TS 38.211, section 4.3.2). The total number of slotFormats in the slotFormatCombinations list does not exceed 512.

In this context, reference is made to the technical specification 3GPP TS 38.211 published June 2018 on the website 3gpp.org, and titled, "*NR; Physical channels and modulation (Release 15)*" which in its entirety is incorporated herein by reference.

Section 4.3.2 of this document discloses that for subcarrier spacing configuration $\mu$, slots are numbered $n_s^\mu \in \{0, \ldots, N_{slot}^{subframe, \mu}-1\}$ in increasing order within a subframe and $n_{s,f}^\mu \in \{0, \ldots, N_{slot}^{frame, \mu}-1\}$ in increasing order within a frame. There are $N_{symb}^{slot}$ consecutive OFDM symbols in a slot where $N_{symb}^{slot}$ depends on the cyclic prefix as given by Tables 4.3.2-1 and 4.3.2-2. The start of slot $n_s^\mu$ in a subframe is aligned in time with the start of OFDM symbol $n_s^\mu N_{symb}^{slot}$ in the same subframe.

OFDM symbols in a slot can be classified as 'downlink,' 'flexible,' or 'uplink' symbols. Signaling of slot formats is described in subclause 11.1 of 3GPP TS 38.213. In a slot in a downlink frame, the UE shall assume that downlink transmissions only occur in 'downlink' or 'flexible' symbols. In a slot in an uplink frame, the UE shall only transmit in 'uplink' or 'flexible' symbols. A UE not capable of full-duplex communication is not expected to transmit in the uplink earlier than $N_{Rx-Tx}T_c$ after the end of the last received downlink symbol in the same cell where $N_{Rx-Tx}$ is given by 3GPP TS 38.101.

For the specification of the different downlink control information (DCI) formats, reference is made to the technical specification 3GPP TS 38.212 in version V15.2.0 published June 2018 on the website at 3gpp.org, and titled, "*NR; Multiplexing and channel coding (Release 15)*," which in its entirety is incorporated herein by reference. Particular reference is made to section 7.3 titled "*Downlink control information*," which defines in sub-section 7.3.1.3.1 the DCI Format 2_0.

In this sub-section 7.3.1.3.1, it is disclosed that the DCI format 2_0 is used for notifying the slot format. The following information is transmitted by means of the DCI format 2_0 with CRC scrambled by SFI-RNTI:

Slot format indicator 1, Slot format indicator 2, . . . , Slot format indicator N.

The size of DCI format 2_0 is configurable by higher layers up to 128 bits, according to sub-section 11.1.1 of 3GPP TS 38.213 (referenced above).

Benefits of the Present Disclosure

In the context of the present disclosure, it is recognized that the monitoring of search space sets is dispensable, for example, in a situation where the Listen-Before-Talk operation has failed with its clear channel assessment (CCA) on one or more 20 MHz unit(s). Particularly, if the search space set is associated with the scheduling on resources located in the respective 20 MHz unit, then the UE can be released from its requirement to monitor this search space set.

For this purpose, the present disclosure introduces an indication through which the gNB indicates to the UE that it can skip the monitoring of individual search spaces. Advantageously, this indication has no influence on the configuration of the respective search space sets. In other words, the provided indication pertains to temporary effects, e.g., the failed clear channel assessment (CCA). For this reason, it would also be neither necessary nor feasible to adapt the configuration of the search spaces in this respect.

Beneficially, the present disclosure provides a mechanism for reducing the energy consumption in the UE.

As already set out above, the "good neighbor" criterion requires the gNB to avoid the scheduling of transmission in resources for which the clear channel assessment (CCA) has failed. In absence of such scheduling, the UE will neither expect nor carry out any downlink or uplink transmission. In other words, this absence of such scheduling would be sufficient to fulfill the "good neighbor" criterion and to abide to certain regulations, e.g., Listen-Before-Talk.

Importantly, the present disclosure goes one step further. The mechanism of the present disclosure, via an indication transmitted from the gNB to the UE, additionally signals to the UE that it can skip monitoring individual search space sets. For example, due to the failed clear channel assessment (CCA), the gNB already knows that it is unnecessary for the UE to monitor such individual search space sets. And, without this monitoring of the individual search space sets, the energy consumption in the UE can be further reduced.

Generic Scenario

Figure 2:
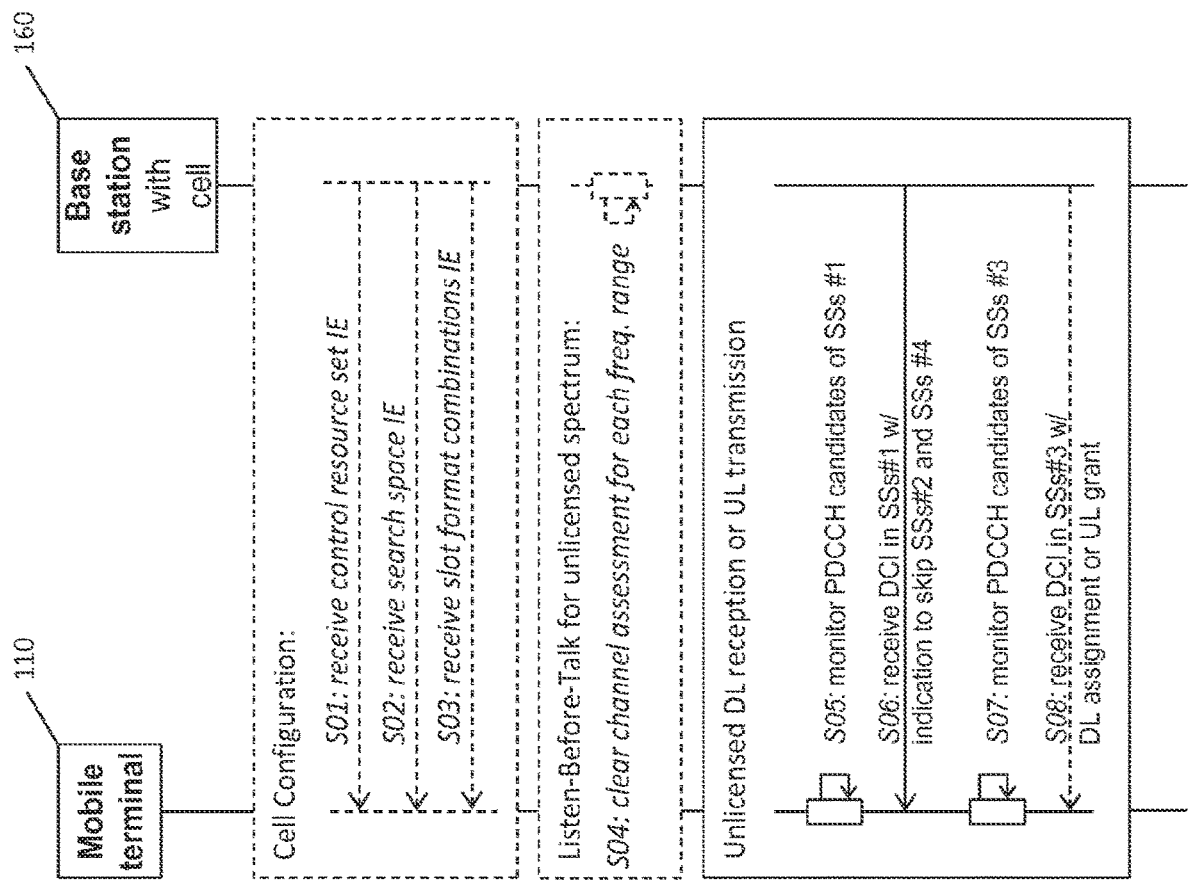
FIG. 2 illustrates a sequence diagram of a wideband operation in an unlicensed spectrum according to a specific implementation in a 3GPP NR deployment scenario.

FIG. 1 illustrates a block diagram of a wireless communication system including a mobile terminal 110 (also referred to as user equipment, UE), and a base station 160 (also referred to as g Node B, gNB). The mobile terminal 110 comprises a processor 130 and a transceiver 120 which are indicated as separate building block in the diagram. Similarly, the base station 160 comprises a processor 180 and a transceiver 170 which are indicated as separate building block in the diagram. The block diagram is used for describing the mechanism depicted in FIG. 2, namely the generic scenario where the monitoring of individual search space sets can be skipped.

Particularly, the wireless communication system of the block diagram includes base station 160 which is configured with a cell for wideband operation in an unlicensed spectrum. The configured cell has with a carrier bandwidth which is divided into a plurality of frequency ranges, e.g., four frequency ranges termed freq. range #1-#4 in FIG. 3-5.

In the context of the present disclosure, it is generally understood that a cell for wideband operation can have a carrier bandwidth of, for example, 100 MHz, or 200 MHz. This carrier bandwidth, however, depends on the unlicensed spectrum in which the cell is configured. In other words, the carrier bandwidth of the cell is operating exclusively in the unlicensed spectrum.

Due to this configuration of the cell in the unlicensed spectrum, the base station 160 is required to abide to certain regulations, e.g., the Listen-Before-Talk requirement, in order to ensure that the "good neighbor" criterion is met. The base station 160 will thus perform Listen-Before-Talk operations, specifically a clear channel assessment (CCA) (see step S04 in FIG. 2) prior to performing any transmission, including the scheduling of an UE via a physical downlink control channel, PDCCH.

Now, the (most recent) agreement in 3GPP RAN1 #92bis provides that the Listen-Before-Talk operations are performed on units of 20 MHz, e.g., to a fraction of the carrier bandwidth of the cell in wideband operation. This agreement has advantages, but also disadvantages for the wideband operation of the base station 160 configured with the cell.

Generally, it is advantageous to perform Listen-Before-Talk operations on separate, narrow units of 20 MHz. With such separate Listen-Before-Talk operations it is possible to conduct clear channel assessment (CCA) with high granularity. The high granularity is a direct result of the narrow units of 20 MHz. For example, such separate Listen-Before-Talk operation may result in a successful clear channel assessment for some of the narrow units of 20 MHz, and a failure for some other of the narrow units of 20 MHz.

Due to this high granularity of the clear channel assessment, the base station 160 can restrict its transmissions to only those of the narrow units of 20 MHz for which the clear channel assessment was successful. There is no longer a need for the base station to interrupt any transmissions on the entire carrier bandwidth, if it has failed on a clear channel assessment in a single unit of 20 MHz.

At the same time, it is (also) disadvantageous to perform Listen-Before-Talk operations on separate, narrow units of 20 MHz. These narrow units of 20 MHz impose a substantial restriction on the scheduling of downlink receptions or uplink transmissions of a mobile terminal. Particularly, these restrictions narrow-down the locations where, for example, the physical downlink control channel, PDCCH, can be transmitted. The base station can, for example, no longer be configured with the PDCCH as flexible as before.

Assuming, for the sake of argument that a single PDCCH would span over resources located in plural of the narrow units of 20 MHz. Then, even if only one of these plural narrow units of 20 MHz produces a failure in the clear channel assessment, this will force the base station 160 to interrupt the transmission of the entire PDCCH. As of today, 3GPP NR does not permit omitting parts of a single PDCCH.

On face value, it would thus seem advisable to restrict the PDCCH, more specifically the PDCCH candidates of a search space set, to only those resources which are located in such a single unit of 20 MHz. However, there may be other constrains which prevent from imposing such a narrow bandwidth restriction towards the resources where a search space set, and thus its PDCCH candidates, can be located.

In the context of the present disclosure it is, hence, required that the PDCCH candidates of a search space set, i.e., of at least a first search space set, are located in a designated first frequency range (termed freq. range #1 for ease of reference), and not necessarily a narrow unit of 20 MHz. For example, the designated first frequency range can also correspond to an integer multiples of 20 MHz.

The designated first frequency range is one of the plurality of frequency ranges into which the carrier bandwidth of the cell in wideband operation is divided. And, all of the plurality of frequency ranges shall not be understood as being restricted to the narrow units of 20 MHz only.

Figure 3:
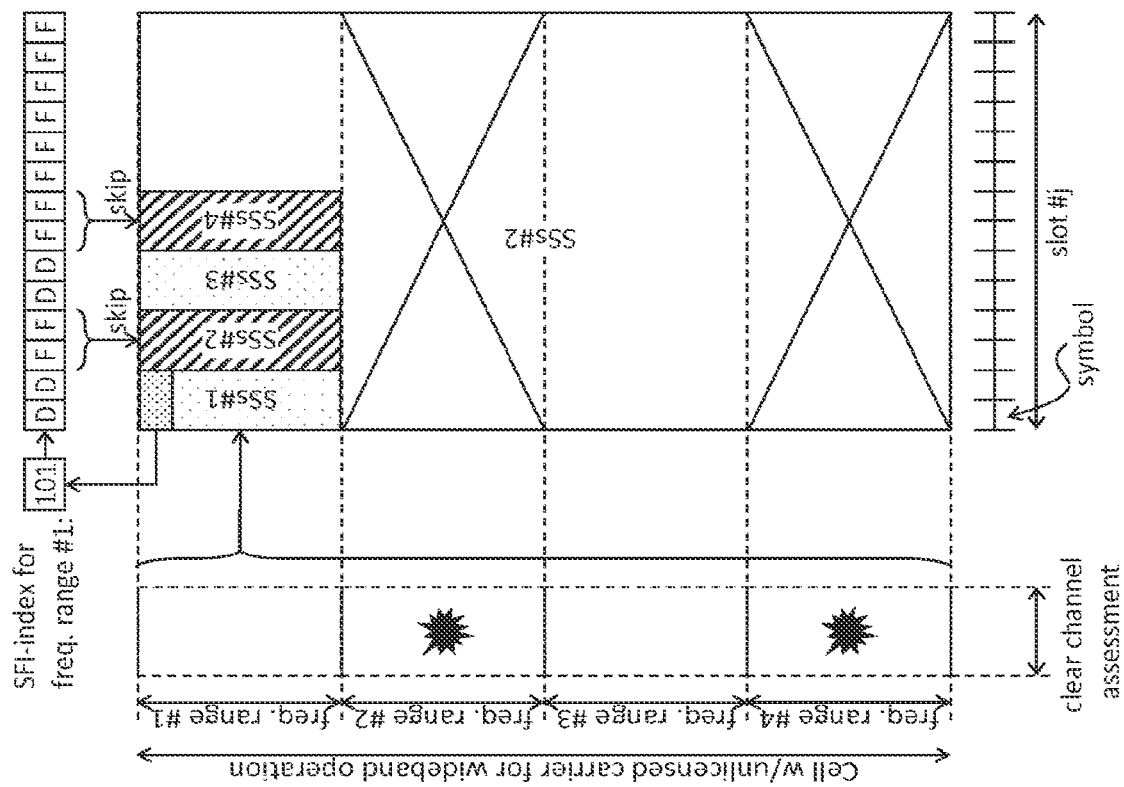
FIG. 3 shows a first example for the specific implementation of the wideband operation in an unlicensed spectrum in a 3GPP NR deployment scenario.
Figure 4:
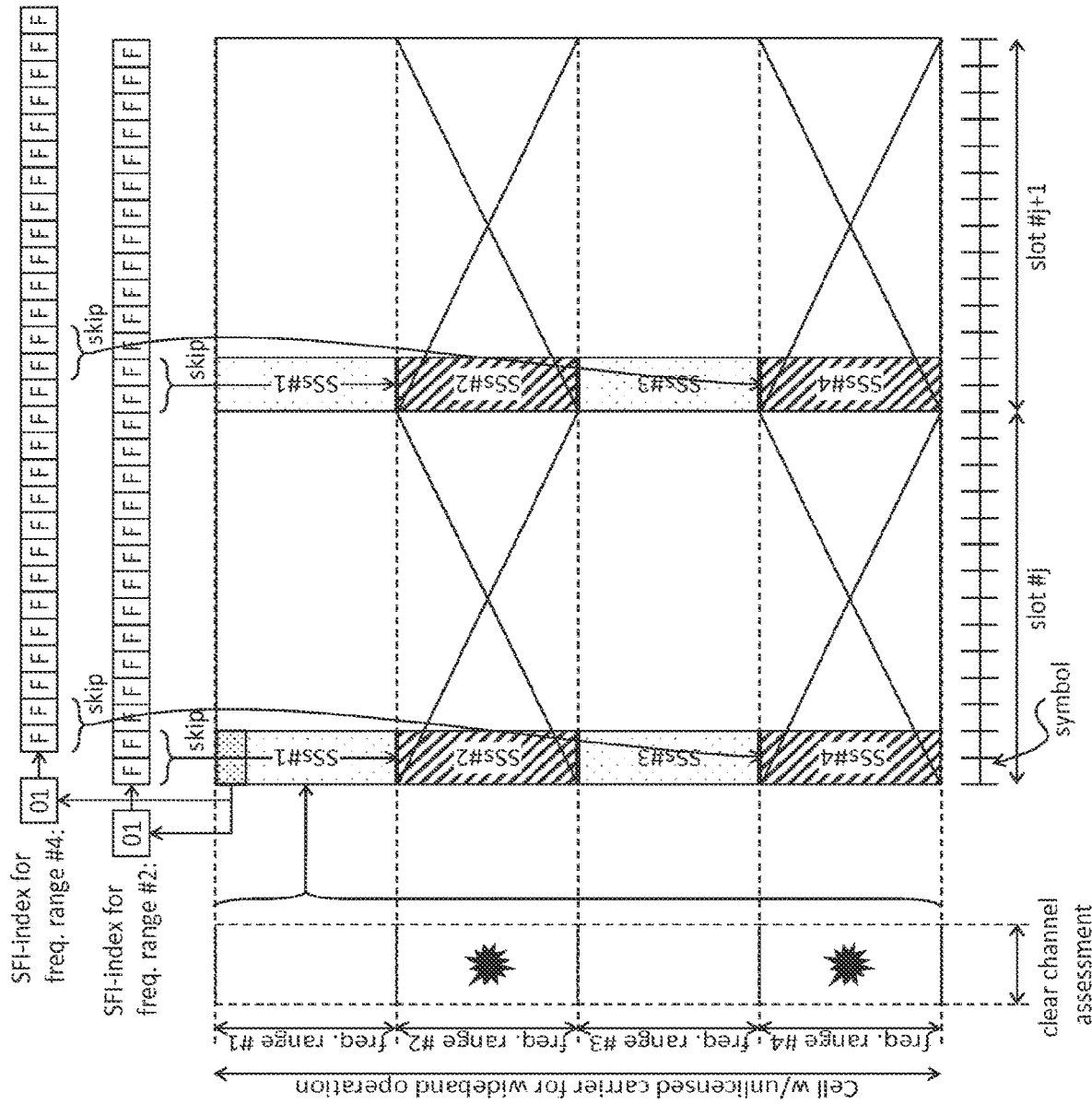
FIG. 4 depicts a second example for the specific implementation of the wideband operation in an unlicensed spectrum in a 3GPP NR deployment scenario.

For illustrative purposes only, it is assumed in the following that the clear channel assessment (CCA) performed by the base station 160 is successful on the first and third frequency ranges, freq. range #1 and freq. range #3, and produces a failure for the second and fourth frequency range, freq. range #2 and freq. range #4. The failure is indicated in FIGS. 3-5 with the pictogram of a star.

Having successfully performed the clear channel assessment on the dedicated first frequency band, the base station 160 transmits to the mobile terminal 110 downlink control information, DCI, (discussed below) in a first search space in the designated first frequency range.

The mobile terminal 110 monitors (see step S05 of FIG. 2) physical downlink control channel, PDCCH, candidates of the first search space set which are located in the designated first frequency range, freq. range #1. Importantly, the first frequency range is a designated frequency range, since the mobile terminal 110 has to know where to start with the monitoring of PDCCH candidates.

In an exemplary implementation, the designation results from the fact, that this frequency range is carrying at least one of a synchronization signal and physical broadcast channel block, SSB, a cell defining synchronization signal and physical broadcast channel block (cell-defining SSB), reference signals for radio resource management, RRM, reference signals for radio link monitoring, RLM, and a hybrid automatic repeat request acknowledgement (HARQ-ACK).

Importantly, all these uses of the first frequency range relate to signaling which the mobile terminal 110 has received prior to the CCA at the base station 160, and prior to the beginning of the start of the monitoring in the slot, and thus is available to the mobile terminal 110 from before. For example, the SSB and the cell-defining SSB refer to signaling which a mobile terminal is required to receive during initial access of a cell.

In spite of the assumption that the base station 160 is successful with its clear channel assessment (CCA) on the first frequency range, the mobile terminal 110 will always, monitor PDCCH candidates of the first search space set located in the designated first frequency range. Merely the outcome of this monitoring is different.

As result of the successful CCA, the mobile terminal 110 receives (see step S06 in FIG. 2) a downlink control information, DCI, which is transmitted in the first search space set of the designated first frequency range. In case of a failure with CCA, the base station 160 would not perform any transmission on resources located in the first frequency range to obey the Listen-Before-Talk requirement. In this case, the mobile terminal 110 would not receive anything, particularly not the DCI as mentioned before.

The DCI received by the mobile terminal 110 includes an indication. This indication indicates whether or not the mobile terminal 110 is to skip monitoring some specific or all PDCCH candidates in at least one second search space set associated with at least one second frequency range from the plurality of frequency ranges.

In more detail, a distinction is made between a case where the indication only indicates that some specific PDCCH candidates which are to be skipped during monitoring, and a case where the indication indicates that all PDCCH candidates in a second search space set which are to be skipped during monitoring.

This distinction may have an effect when considering some exemplary implementations, which are conceivable in view of presently applicable definition of search space sets in NR. This distinction shall, however, not restrict the present disclosure.

In such exemplary implementations, it is possible that not all, but only some specific PDCCH candidates in the (single) second search space set are associated with a second frequency range, and other (different) specific PDCCH candidates in the (single) second search space set are associated with a (different) third frequency range.

Thus, in case of a CCA failure for the second frequency range and a successful CCA for the third frequency range, the base station 160 may transmit to the mobile terminal 110 an indication to skip monitoring only those PDCCH candidates of the (single) second search space set, which are associated with the second frequency range for which the CCA failure has occurred.

In alternative exemplary implementation, it is also possible that each of the search space sets is associated with one (different) frequency range. Each of the at least one second search space set is associated with one of the at least one second frequency range. Then, the base station 160 may transmit to the mobile terminal 110 an indication to skip monitoring all PDCCH candidates of the (single) second search space set, which is associated with the second frequency range.

Importantly, the at least one second search space set needs not be located in the respective at least one second frequency range. Rather, the at least on second search space set may also be located in the designated first frequency range, for example, consecutive in time domain. One such example has been shown in FIG. 3. Merely, the some specific or all PDCCH candidates in the at least one second search space set need to be associated with the at least one second frequency range.

Having received the indication, the mobile terminal 110 monitors (see step S07 in FIG. 2) the specific or all PDCCH candidates associated with the at least one second frequency range if, and only if, the received DCI does not indicate to skip monitoring the (same) specific or all PDCCH candidates in the at least one second search space set.

In the exemplary implementation where the CCA for the second and fourth frequency range failed, and the CCA for the third frequency range was successful, the received DCI (only) includes an indication to skip monitoring all PDCCH candidates of the second and fourth search space set. Thus, the mobile terminal 110 monitors all PDCCH candidates of the third search space set, i.e., all PDCCH candidates which are associated with the third frequency range for which the CCA was successful.

Monitoring the specific or all PDCCH candidates, for which no indication to skip the monitoring is included, enables the mobile terminal 110 to receive a DCI (see step S08 in FIG. 2) including a downlink assignment, which is assigning resources for downlink receptions, or including an uplink grant, which is assigning resources for uplink transmissions.

Specific Implementation

Referring now to a specific implementation of the generic scenario explained above. This implementation is describing a 3GPP NR specific deployment scenario which, however, shall not restrict the generic scenario. In this specific implementation, the mobile terminal 110 is provided with an NR specific cell configuration.

During the cell configuration, the mobile terminal 110 receives (see step S01 in FIG. 2) a control resource set (CORESET) information element (IE) via radio resource control (RRC) signaling. The IE is termed "ControlResourceSet" IE and is consistent with the definition discussed above with regard to 3GPP TS 38.331 (referenced above). Importantly, the CORESET IE includes a frequencyDomainResources field defining groups of six resource blocks which are fully contained in the resources within which the CORESET is configured.

Further during the cell configuration, the mobile terminal 110 receives (see step S02 in FIG. 2) a search space information element (IE) via RRC signaling. This IE is termed "SearchSpace" and is consistent with the definition discussed above with regard to 3GPP TS 38.331 (referenced above). Importantly, this search space IE includes a monitoringSymbolsWithinSlot field defining symbols for PDCCH monitoring in a slot.

Suppose, the search space IE is received for the first search space set. Then this search space IE defines—within the time domain—via the monitoringSymbolsWithinSlot field the location in terms of a symbol in a slot, where the mobile terminal 110 shall start in time domain with the monitoring of PDCCH candidates for the first search space set.

Additionally, this search space IE includes an identification of the applicable CORESET received before as CORESET IE. Through this identification, it defines—within the frequency domain—via the frequencyDomainResources field in terms of groups of six resource blocks, where the mobile terminal 110 shall start in frequency domain with the monitoring of PDCCH candidates for the first search space set.

Thus, these two information elements permit the mobile terminal 110 to monitor PDCCH candidates in the first search space set in the NR specific deployment scenario.

Additionally, the mobile terminal 110 also receives (see step S03 in FIG. 2), during the cell configuration, at least one slot format combinations IE via RRC signaling. This IE is termed, "slotFormatCombinations" and is not consistent with the definition discussed above with regard to 3GPP TS 38.331 (referenced above).

Different from the definition discussed above, each of the at least one slot format combinations IE(s) is separately pre-configuring slot formats for a respective one of the plurality of frequency ranges (not only one per cell). The at least one slot format combinations IE(s) nevertheless permit the base station 160 to configure the mobile terminal 110 with different slot formats for different frequency ranges within the cell.

Yet, consistent with the above discussion with regard to 3GPP TS38.211, each slot format specifies how the individual symbols of the slot are to be used (i.e., as downlink symbol, as uplink symbol or as flexible symbol). The base station 160 can configure in the mobile terminal 110 with a combination of plural slot formats, and subsequently, the base station can select either one of these plural slot formats for use on a per one or a number of slot basis.

Suppose, for example, the base station 160 configures the mobile terminal 110 with a combination of four different slot formats. This may result in the mobile terminal 110 being provided with an association between four specific slot formats and four index values which can be used in the selection operation. The association may be shown as in Table 1 below:

TABLE 1

Exemplary Slot Format Combination

| Index value (for reference in DCI) | Slot format (one slot with 14 symbols) |
|---|---|
| 00 | DD DD DD DD DD DD DD |
| 01 | FF FF FF FF FF FF FF |
| 10 | UU UU UU UU UU UU UU |
| 11 | Reserved |

It shall not go without saying that the slot format in Table 1 is abbreviated and the "D" represents a downlink symbol, "F" represents a flexible symbol, and "U" represents an uplink symbol.

Again, the above discussion of the slot format combinations IE does not state to which frequency range the slot format combinations are applicable. Conventionally, the base station 160 would configure these slot format combinations in the mobile terminal 110 such that it is applicable to the (entire) cell in wideband operation.

This is however not the approach in this specific implementation. For this reason, the definition of the slot format combinations IE is not consistent with what is described in 3GPP TS 38.331 or 3GPP TS 38.213. Particularly, in this specific implementation the slot format combinations are configured for each frequency range separately (not only one per cell).

Also here, the base station 160 performs (see Step S04 in FIG. 2) a clear channel assessment (CCA) for each of the plurality of frequency ranges into which the carrier bandwidth of the cell is divided. Emphasis is laid on the fact that each of the frequency ranges is not necessarily restricted to a narrow unit of 20 MHz. Instead, each may also correspond to integer multiples of 20 MHz.

For illustrative purposes only, it is again assumed that the clear channel assessment (CCA) performed by the base station 160 is successful on the first and third frequency ranges, and produces a failure for the second and fourth frequency range. Having successfully performed the clear channel assessment (CCA) on the dedicated first frequency band, the base station 160 transmits to the mobile terminal 110 downlink control information, DCI, (discussed below) in a first search space in the designated first frequency range.

The mobile terminal 110 monitors (see step S04 of FIG. 2) physical downlink control channel, PDCCH, candidates of the first search space set located in the designated first frequency range, freq. range #1. In this specific implementation, the first search space set is a type 3 PDCCH common search space set, which is carrying DCIs that are scrambled with a slot format indicator, SFI, radio network temporary identifier, RNTI. Accordingly, the mobile terminal 110 monitors the first search space set for DCIs having DCI format 2_0.

The mobile terminal 110 then receives (see step S06 of FIG. 2) the downlink control information, DCI including an indication whether or not to skip monitoring PDCCH candidates. In this specific implementation, the received DCI has a DCI format 2_0 which implies that it is used by the base station 160 to notify to the mobile terminal 110 of the slot format. Through the notification of specific slot formats to the mobile terminal 110, the base station 160 (also) transmits the indication whether or not to skip monitoring of PDCCH candidates.

Similar to the slot format combinations IE, the DCI format 2_0 of the specific implementation also differs from what is discussed above. For this reason, the definition of the DCI format 2_0 is also not consistent with what is described in 3GPP TS 38.213. Particularly, in the specific implementation, the DCI format 2_0 contains a separate slot format indicator for each of the frequency ranges (not only one per cell).

This DCI format 2_0 carries a slot format indicator, termed SFI-index, for each frequency range, namely in the example, an SFI-Index for freq. range #1, another SFI-Index for freq. range 2, a further SFI-Index for freq. range #3 and an even further SFI-Index for freq. range #4. This SFI-Index value corresponds to the index values configured in the mobile terminal 110 through the slot format combinations IE.

Again, emphasis is laid on the fact that both, the SFI-Index as well as the slot format combinations IE are signaled on a per frequency range basis. In this respect, the base station 160 provides the mobile terminal 110, first, with a slot format combinations IE for each frequency range, and then, with an SFI-Index for each frequency range. There is clear association between the two.

In the illustrative example, the mobile terminal 110 thus receives a DCI including the indication, namely a DCI having DCI format 2_0 with a sequence of four SFI-Indexes for each of the frequency ranges, freq. range #1-freq. range #4. Then, the mobile terminal 110 uses the four SFI-Indexes to determine a slot format for each one of the respective four frequency ranges. This determination references the respective slot format combinations discussed above.

Supposing, for the sake of example, that each of the four frequency ranges is (separately) configured with same slot format combinations, namely the slot format combinations shown in Table 1 above. And supposing further, that the SFI-Index for freq. range #1 is "00," the SFI-Index for freq. range #2 is "01," the SFI-Index for freq. range #3 is "00" and the SFI-Index for freq. range #4 is "01." In other words, the received DCI having format DCI format 2_0 carries the bits '00' '01' '00' and '01.'

Then, with the association in Table 1 this means that the slot, for which the mobile terminal 110 receives the DCI, is configured with 14 downlink symbols for freq. range #1, with 14 flexible symbols for freq. range #2 with 14 downlink symbols for freq. range #3 and with 14 flexible symbols for freq. range #4. In other words, each of the sequence of slot format indicator, SFI, index values in the received DCI is interpreted by the mobile terminal 110 according to the separately pre-configured set of slot formats (see e.g., Table 1) for the respective one of the plurality of frequency ranges (see freq. range #1-#4).

Importantly, this received DCI indicates whether or not to skip monitoring PDCCH candidates under the assumption that the mobile terminal 110 is (already) configured with the cell (see steps S01-S03 in FIG. 3). In different words, this indication builds on the prerequisite that the mobile terminal 110 already knows where the individual search space sets are located for monitoring the PDCCH candidates.

Notably, this is an inherent prerequisite to the monitoring (see step S05 in FIG. 2) of the PDCCH candidates of a first search space set. Only when the mobile terminal 110 knows where the first search space set is located, then it can monitor the PDCCH candidates of that search space. Thus, it follows inherently that a mobile terminal, capable of monitoring the PDCCH candidates, is (already) configured with the cell.

And the same also holds true for the at least one second search space set mentioned above in the generic scenario.

Returning to the example with four frequency ranges, freq. range #1-#4, it is obvious that the definition of e.g., only two search space sets can be disadvantageous. Only two search space sets may limit the capacity of PDCCH and hence reduces the chance that UE can be scheduled. For explanation purposes, it is thus assumed that there are four different search space sets, referred to as SSs #1, SSs #2, SSs #3, and SSs #4.

In view of the description above, it is evident that the first search space set SSs #1, in which the mobile terminal 110 receives a DCI with the DCI format 2_0 is a type 3 PDCCH common search space set, consistent with what is defined in 3GPP TS 38.213, and the second to fourth search space sets SSs #2-#4, in which the mobile terminal 110 is enabled to receive and downlink assignment or an uplink grant, are UE-specific search space sets, again consistent with what is defined in 3GPP TS 38.213.

For the sake of example, the mobile terminal 110 knows the (exact) location in time domain and in frequency domain where to monitor PDCCH candidates in the four search space sets. It is assumed that the mobile terminal 110 knows that the first and second symbol of each frequency range #1-#4 in a slot carry the PDCCH candidates of the respective first to fourth search space set. In other words, the first search space sets is contained in the freq. range #1, the second search space set is contained in the freq. range #2, the third search space set is contained in the freq. range #3, and the fourth search space set is contained in the freq. range #4 of the slot. An example is shown in FIG. 4.

In this example, the mobile terminal 110 then receives the DCI having a DCI format 2_0 which notifies the mobile terminal 110 that the slot, for which the DCI is received, is configured with 14 downlink symbols for freq. range #1, with 14 flexible symbols for freq. range #2 with 14 downlink symbols for freq. range #3 and with 14 flexible symbols for freq. range #4.

Then, the mobile terminal 110 immediately identifies the discrepancy between the configured location of the PDCCH candidates in the second and fourth search space set and the slot format indicated by the received DCI for the second and fourth freq. range #2 and #4.

If the configured location of the second and fourth search space set are the first and second symbol of the slot in the respective second and fourth frequency range, then the mobile terminal 110 would expect that these symbols were also indicated as downlink symbols. However, the received DCI indicates these symbols (i.e., all 14 symbols) of the respective second and fourth frequency range to be flexible symbols as noted above. In other words, there is a discrepancy between the configuration of search space sets and the notification of slot format for the second and fourth freq. range #2 and #4.

At the same time, the mobile terminal cannot identify such a discrepancy for the first and third search space set, i.e., the search space sets located in the freq. range #1 and #3.

Now, it is important to realize that this discrepancy is utilized by the base station 160 of the specific implementation to transmit to the mobile terminal 110 the indication whether or not to skip monitoring of specific search space sets. If, for example, the received DCI having DCI format 2_0 includes an SFI-Index which specifies a slot format with flexible or uplink symbols (termed: non-downlink symbols) at a location where a search space set is configured, then the mobile terminal 110 interprets this as an indication that the monitoring of PDDCH candidates of the respective search space is skipped.

In more general terms, in case the via SFI-index indexed one of the pre-configured (see Table 1) slot formats specifies a non-downlink symbol (i.e., flexible or uplink symbol) for resources in which the at least one second search space set is located, then the mobile terminal 110 interprets the received DCI as including an indication that the mobile terminal is to skip monitoring some specific or all PDCCH candidates in the at least one second search space set associated with the respective one of the at least one second frequency range.

The above discussion of the specific implementation relates to the case where the indication whether or not to skip monitoring a specific search space set corresponds to an SFI-index in a DCI format 2_0 which is associated with a single search space set. In other words, the above postulates that the received DCI having DCI format 2_0 includes SFI-indexes for each frequency range. This example is however not intended as a general restriction to the above discussion. Rather, this example is given for reasons of simplicity.

As already mentioned above, the indication to skip monitoring of PDCCH candidates can be for some specific or all PDCCH candidates of a search space set. This results from the fact that each search space set may, however, must not be associated with only one frequency range (extending the specific implementation discussed above).

In the context of this specific implementation, this means that the DCI format 2_0 does not necessarily include an SFI-index for each frequency range. Rather, as the case may be, the DCI format 2_0 may also include SFI-indexes which are associated with plural ranges. Such SFI indexes then index a pre-configured slot format where parts pertain to PDCCH candidates located in resources (i.e., symbols) that are associated with the scheduling in a one frequency range, and other parts pertain to PDCCH candidates located in resources (i.e., other symbols) that are associated with the scheduling in another (different) frequency range.

This specific implementation is merely limited by the inherent restrictions in the DCI format 2_0. When the DCI format 2_0 is used for transmitting the indication whether or not to monitor PDCCH candidates, then this DCI format 2_0 is restricted to an indication on a symbol level. In other words, the SFI-indexes in the DCI format 2_0 merely prescribe—in the time domain—whether a symbol is a downlink symbol or a non-downlink symbol (i.e., flexible or uplink symbol).

Thus, this specific implementation prescribes that the specific PDCCH candidates, for which the monitoring can be skipped, are located in resources which share, in time domain, a same symbol or same set of symbols in the slot.

Evidently, the indication as non-downlink symbol can be interpreted by the mobile terminal 110 as an indication to skip monitoring PDCCH candidates which are located in the same symbol. If for example, the search space set extends over two contiguous symbols, then, an indication of (only) the first symbol as non-downlink symbol (where the second symbol is a downlink symbol) may be understood, in this case, as an indication to skip monitoring only some specific PDCCH candidates which are (exclusively) located in this first symbol in time domain. For the second symbol, which is indicated as downlink symbol, the mobile terminal can still perform monitoring of PDCCH candidates.

Alternatively, the indication as non-downlink symbol can also be interpreted by the mobile terminal 110 as an indication to skip monitoring all PDCCH candidates, i.e., the PDDCH candidates which are located in a same set of symbols forming the search space set. If for example, the search space set extends over two contiguous symbols, then, an indication of (only) the first symbol as non-downlink symbol be understood, in this alternative case, as an indication to skip monitoring the first and second symbol forming a set of symbols which are located (in an overlapping manner) and which are carrying all PDCCH candidates.

a further IE termed "slotFormatCombinationsPerLBTunit" IE. In particular, this slot format combinations per LBT unit IE is defined as a sequence of plural fields which comprise, among others a "servingCellId" field, an "LBTunitId" field and the "slotFormatCombinations" field discussed before, where LBT stands for Listen-Before-Talk.

```
Pseudocode 1: Slot format combinations IE
SlotFormatCombinationsPerLBTunit information element -- ASN1START
-- TAG-SLOTFORMATCOMBINATIONSPERLBTUNIT-START
SlotFormatCombinationsPerLBTunit ::= SEQUENCE {
    servingCellId           ServCellIndex,
    LBTunitId               LBTunitIndex,
    subcarrierSpacing       SubcarrierSpacing,
    subcarrierSpacing2      SubcarrierSpacing    OPTIONAL, -- Need R
    slotFormatCombinations  SEQUENCE (SIZE (1..maxNrofSlotFormatCombinationsPerSet)) OF
                                SlotFormatCombination OPTIONAL,
    positionInDCI           INTEGER(0..maxSFI-DCI-PayloadSize-1)   OPTIONAL,
    ...
}
SlotFormatCombination ::=   SEQUENCE {
    slotFormatCombinationId   SlotFormatCombinationId,
    slotFormats               SEQUENCE (SIZE (1..maxNrofSlotFormatsPerCombination)) OF INTEGER
                                  (0..255)
}
SlotFormatCombinationId ::= INTEGER (0..maxNrofSlotFormatCombinations PerSet-1)
-- TAG-SLOTFORMATCOMBINATIONSPERLBTUNIT-STOP
```

It shall go without saying, that also in this specific implementation that each of the plurality of frequency ranges is identified via either one of plural different Listen-Before-Talk range identifiers, one of different mobile terminal specific frequency range identifiers, one of different control resource set, CORESET, identifiers, or one of different bandwidth part, BWP, indexes. Using the Listen-Before-Talk identifier implies that the frequency range corresponds to a Listen-Before-Talk range, i.e., one of the units of 20 MHz mentioned above.

Using the mobile terminal specific frequency range identifier implies that the base station first configures the mobile terminal with specific frequency ranges that are referenced via corresponding identifiers. Further, using the CORESET identifier implies that the frequency ranges correspond to the respective "frequencyDomainResources" specified in each CORESET IE. And using the BWP indexes implies that the frequency ranges correspond to respective BWPs.

First Exemplary Implementation of the Slot Format Combinations IE

As already mentioned for the specific implementation, the mobile terminal 110 receives (see step S03 in FIG. 2), during the cell configuration, at least one slot format combinations IE via RRC signaling. This IE is termed "slotFormatCombinations" and is not consistent with the definition discussed above with regard to 3GPP TS 38.331 (referenced above).

Different from the definition discussed above, each of the at least one slot format combinations IE(s) is separately pre-configuring slot formats for a respective one of the plurality of frequency ranges (not only one per cell). The at least one slot format combinations IE(s) nevertheless permit the base station 160 to configure the mobile terminal 110 with different slot formats.

A first exemplary implementation of the slot format combinations IE is shown in the below Pseudocode 1. There, it can be seen that the slot format combinations IE is part of For consistency reasons, the following definition of the LBT unit index IE is also shown in the below Pseudocode 2. There, it can be seen that the Listen-Before-Talk unit indexes are defined as integers running from 0 to some maximum Number defined per cell.

```
Pseudocode 2: Listen-Before-Talk IE
LBTunitIndex information element

-- ASN1START
-- TAG-SERV-CELL-INDEX-START
LBTunitIndex ::=    INTEGER (0..maxNrofLBTunitPerCell-1)
-- TAG-SERV-CELL-INDEX-STOP
-- ASN1STOP
```

Due to this definition of the slot format combinations per LBT unit IE as a sequence of plural fields, it can be ensured that the slot format combinations are separately pre-configuring slot formats for each cell and each of the plurality of frequency ranges which are corresponding to Listen-Before-Talk units, i.e., units of 20 MHz as discussed above.

Second Exemplary Implementation of the Slot Format Combinations IE

As already mentioned for the specific implementation, the mobile terminal 110 receives (see step S03 in FIG. 2), during the cell configuration, at least one slot format combinations IE via RRC signaling. This IE is termed "slotFormatCombinations" and is not consistent with the definition discussed above with regard to 3GPP TS 38.331 (referenced above).

Different from the definition discussed above, each of the at least one slot format combinations IE(s) is separately pre-configuring slot formats for a respective one of the plurality of frequency ranges (not only one per cell). The at least one slot format combinations IE(s) nevertheless permit the base station 160 to configure the mobile terminal 110 with different slot formats.

A first exemplary implementation of the slot format combinations IE is shown in the below Pseudocode 3. There, it can be seen that the slot format combinations IE is part of a further IE termed, "slotFormatCombinationsPerRange" IE which itself is part of a further IE termed, "slotFormatCombinationsPerCell." In particular, the latter slot format combinations per cell IE is defined as a sequence of two fields comprising a "servingCellId" field, the "slotFormatCombinationsPerRange" field. The "slotFormatCombinationsPerRange" IE then includes a sequence of plural fields comprising, among others, a "slotFormatCombiantionRangeId" field and the "slotFormatCombinations" field discussed before.

This definition of "slotFormatCombiantionRangeId" field, which is of the value "LBTunitIndex," there does not necessarily have to be a correspondence between the ranges and the LBT units. For example, this definition also permits specifying a frequency range which is wider than the LBT unit, at the same time, however encompasses the LBT unit, where LBT stands for Listen-Before-Talk.

frequency ranges, which are however different from the Listen-Before-Talk units, i.e., units of 20 MHz as discussed above.

Exemplary Implementation of the DCI Having DCI Format 2_0

As already mentioned for the specific implementation, the mobile terminal 110 receives a DCI which has the DCI format 2_0. The specific implementation of this DCI format 2_0 also differs from what is discussed above. For this reason, the definition of the DCI format 2_0 is also not consistent with what is described in 3GPP TS 38.213.

Particularly, in the specific implementation, the DCI format 2_0 contains a separate slot format indicator for each of the frequency ranges (not only one per cell). This is shown in the following excerpt, where the DCI slot format is specified as having a sequence of plural slot format indicators, each corresponding to a specific cell and a specific frequency range.

Pseudocode 3: Slot format combination IE
SlotFormatCombinationsPerCell information element

```
-- ASN1START
-- TAG-SLOTFORMATCOMBINATIONSPERCELL-START
SlotFormatCombinationsPerCell ::=    SEQUENCE {
   servingCellId                     ServCellIndex,
   SlotFormatCombinationPerRanges    SEQUENCE (SIZE (1..maxNrofSlotFormatCombinationsPerCell))
                                         OF SlotFormatCombinationPerRange
}
SlotFormatCombinationPerRange ::=  SEQUENCE {
   SlotFormatCombinationRangeId      LBTunitIndex,
   subcarrierSpacing                 SubcarrierSpacing,
   subcarrierSpacing2                SubcarrierSpacing      OPTIONAL, -- Need R
   slotFormatCombinations            SEQUENCE (SIZE (1..maxNrofSlotFormatCombinationsPerSet))
                                         OF SlotFormatCombination      OPTIONAL,
   positionInDCI                     INTEGER(0..maxSFI-DCI-PayloadSize-1)   OPTIONAL,
   ...
}
SlotFormatCombination ::=            SEQUENCE {
   slotFormatCombinationId           SlotFormatCombinationId,
   slotFormats                       SEQUENCE (SIZE (1..maxNrofSlotFormats PerCombination)) OF
                                         INTEGER (0..255)
}
SlotFormatCombinationId ::=          INTEGER (0..maxNrofSlotFormatCombinationsPerSet-1)
-- TAG-SLOTFORMATCOMBINATIONSPERCELL-STOP
-- ASN1STOP
```

For consistency reasons, the following definition of the LBT unit index IE is also shown in the below Pseudocode 4. There, it can be seen that the Listen-Before-Talk unit indexes are defined as integers running from 0 to some maximum Number defined per cell.

Pseudocode 4: Listen-Before-Talk IE
LBTunitIndex information element

```
-- ASN1START
-- TAG-SERV-CELL-INDEX-START
LBTunitIndex ::=    INTEGER (0..maxNrofLBTunitPerCell-1)
-- TAG-SERV-CELL-INDEX-STOP
-- ASN1STOP
```

Due to this definition of the slot format combinations per cell IE as a sequence of plural fields, it can be ensured that the slot format combinations are separately pre-configuring slot formats for each cell and each of the plurality of 7.3.1.3.1     Format 2_0
The DCI format 2_0 is used for notifying the slot format. The following
information is transmitted by means of the DCI format 2_0 with CRC
scrambled by SFI-RNTI:
-            Slot format indicator 1-1, Slot format indicator 1-2, ..., Slot
format indicator 2-1, Slot format indicator 2-2, ... Slot format indicator
N-M.
Where "Slot format indicator N-M" indicates the slot format for cell
N over freq. range M.

EXAMPLE 1 FOR SPECIFIC IMPLEMENTATION

Now, with reference to FIG. 3 a first example is given for the specific implementation related to the 3GPP NR specific deployment scenario discussed above. For reasons of brevity, only those details are mentioned, which do not directly follow from the above discussion of FIG. 2.

In this example, it is assumed that the mobile terminal 110 receives for the freq. range #1 (see step S03 in FIG. 2) a slot format combinations IE, which configures the mobile terminal 110 with a combination of eight different slot formats. This may result in the mobile terminal 110 being provided with an association between eight specific slot formats and eight index values which can be used in the selection operation for freq. range #1. The association may be shown as in Table 2 below.

TABLE 2

Slot Format Combination for freq. range #1

| Index value (for reference in DCI) | Slot format (one slot with 14 symbols) |
|---|---|
| 000 | DD DD DD DD FF FF FF |
| 001 | DD DD DD FF FF FF FF |
| 010 | DD DD FF DD FF FF FF |
| 100 | DD FF DD DD FF FF FF |
| 011 | DD DD FF FF FF FF FF |
| 101 | DD FF DD FF FF FF FF |
| 110 | DD FF FF DD FF FF FF |
| 111 | DD FF FF FF FF FF FF |

Additionally, the mobile terminal 110 receives for the freq. ranges #2-#4 (see also step S03 in FIG. 2) a slot format combinations IE, which configures the mobile terminal 110 with a combination of four different slot formats. This may result in the mobile terminal 110 being provided with another association between four specific slot formats and four index values which can be used in the selection operation for freq. ranges #2-#4. The association may be shown as in Table 2 below.

TABLE 3

Slot Format Combination for freq. rages #2-#4

| Index value (for reference in DCI) | Slot format (one slot with 14 symbols) |
|---|---|
| 00 | DD DD DD DD DD DD DD |
| 01 | FF FF FF FF FF FF FF |
| 10 | UU UU UU UU UU UU UU |
| 11 | Reserved |

The (previously received) CORESET IE and Search Space IE configure the mobile terminal 110 such that it knows that the first search space set is located in resources corresponding to the first two symbols (i.e., symbols #1-#2) of a slot in the freq. range #1. Similarly, the mobile terminal 110 is configured such that it knows that the second, third and fourth search space sets are located in resources corresponding to the second, third and fourth two symbols (i.e., symbols #3-#4, symbols #4-#6, and symbols #7-#8), respectively.

In other words, in this configuration of the first to fourth search space sets, these search space sets are located in resources corresponding contiguous sets of two symbols in the freq. range #1.

Importantly, the first to fourth search space sets are all configured with a location in the freq. range #1 independent of the fact that the second to fourth search space sets are associated with the respective second to fourth frequency range, freq. range #2-#4. Thus, it can be seen that the CORESET IE for the search space sets does not prescribe a location in the same frequency range with which the search space sets are associated.

Now, it is assumed that the base station 160 carries out Listen-Before-Talk operations, and accordingly performs (see Step S04 in FIG. 2) a clear carrier assessment for each of the freq. ranges #1-#4. In this example, it is again assumed that the clear channel assessment (CCA) performed by the base station 160 is successful on the first and third frequency ranges, and produces a failure for the second and fourth frequency range.

The mobile terminal 110 monitors (see step S05 of FIG. 2) physical downlink control channel, PDCCH, candidates of the first search space set located in the designated first frequency range, freq. range #1. The first search space set is a type 3 PDCCH common search space set, which is carrying DCIs that are scrambled with a slot format indicator, SFI, radio network temporary identifier, RNTI. Accordingly, the mobile terminal 110 monitors the first search space set for DCIs having DCI format 2_0.

The mobile terminal 110 then receives (see step S06 of FIG. 2) the downlink control information DCI, including an indication whether or not to skip monitoring PDCCH candidates. Particularly, the received DCI has a DCI format 2_0 which implies that it is used by the base station 160 to notify to the mobile terminal 110 the slot format to be used. Through the notification of specific slot formats to the mobile terminal 110, the base station 160 (also) transmits the indication whether or not to skip monitoring of PDCCH candidates.

In this example, the received DCI includes a sequences of slot format indicator, SFI, indexes for each of the freq. range #1-#4, where the SFI-Index for freq. range #1 corresponds to '101,' the SFI-Index for freq. range #2 corresponds to '01,' the SFI-Index for freq. range #3 corresponds to '00' and the SFI-Index for freq. range #4 corresponds to '01.' Then, the mobile terminal 110 uses the four SFI-Indexes to determine a slot formats for each one of the respective four frequency ranges. This determination references the respective slot format combinations of Table 2 for freq. range #1 and Table 3 for freq. range #2-#4. Thus, the SFI-Index for freq. range #1 of '101' references the slot format DD FF DD FF FF FF FF. This means that the symbols #1-#2 and symbols #5-#6 in freq. range #1 are downlink symbols, whereas symbols #3-#4 and symbols #7-#8 in freq. range #1 are flexible symbols.

Then, the mobile terminal 110 immediately identifies the discrepancy between the configured location of the PDCCH candidates in the second and fourth search space set, and the slot format indicated by the received DCI for the first freq. range #1.

Since the configured location of the second and fourth search space set are the symbols #3-#4 and symbols #7-#8 of the slot in freq. range #1, the mobile terminal 110 would expect that these symbols were indicated as downlink symbols. However, the received DCI indicates these symbols as flexible symbols. In other words, there is a discrepancy between the configuration of search space sets and the notification of slot format for the freq. range #1.

Now, it is important to realize that this discrepancy is utilized by the base station 160 to transmit to the mobile terminal 110 the indication whether or not to skip monitoring of specific search space sets. In this example, the received DCI specifies a slot format with flexible symbols (i.e.: non-downlink symbols) at a location where the second and fourth search space set is configured. Thus, the mobile terminal 110 interprets this as an indication that the monitoring of PDDCH candidates of the second and fourth search space is skipped.

This indication is however, not restricted to the skipping the monitoring of PDCCH candidates only, but is also applicable to signaling an indication to skip physical downlink share channel, PDSCH, receptions, or physical uplink shared channel, PUSCH, transmission.

In detail, the first three bits "101" tells the mobile terminal 110 to skip monitoring search space sets #2 and #4 in freq. range #1. Further, the 4th and 5th bits "10" tell the mobile terminal 110 to skip any data reception in freq. range #2. The 6th and 7th bits "00" tells the mobile terminal 110 to prepare for receiving a physical downlink share channel, PDSCH, transmission in all symbols over resources in freq. range #3. And the 8th and 9th bits "10" tell the mobile terminal 110 to skip any data reception in freq. range #4.

It is also important to realize that the first search space set where SFI PDCCH is transmitted can also be used to transmit UE-specific PDCCH, e.g., PDCCH with C-RNTI. Then the DL data assignment, or uplink grant, can be already possible when UE receives the first search space set. This allows UE to process UE-specific PDCCHs and corresponding data reception or transmission at the same time when processing SFI-PDCCH. In this sense, receiving DCI format 2_0 (SFI-PDCCH) is not a prerequisite for receiving other PDCCH. The same applies to the mis-detection of SFI-PDCCH case. If SFI-PDCCH is missed by the UE, UE will monitor all the search space sets which have been configured to the UE by RRC.

EXAMPLE 2 FOR SPECIFIC IMPLEMENTATION

Now, with reference to FIG. 4 a second example is given for the specific implementation related to the 3GPP NR specific deployment scenario discussed above. For reasons of brevity, only those details are mentioned, which do not directly follow from the above discussion of FIG. 2.

In this example, it is assumed that the mobile terminal 110 receives for the freq. ranges #1-#4 (see step S03 in FIG. 2) a slot format combinations IE, which configures the mobile terminal 110 with a combination of four different slot formats. This may result in the mobile terminal 110 being provided with an association between four specific slot formats and four index values which can be used in the selection operation for each of freq. ranges #1-#4. The association may be shown as in Table 4 below.

TABLE 4

Slot Format Combination for freq. ranges #1-#4

| Index value (for reference in DCI) | Slot format (two slots with total 28 symbols) |
|---|---|
| 00 | DD FFFFFF FFFFFF DD FFFFFF FFFFFF |
| 01 | FF FFFFFF FFFFFF FF FFFFFF FFFFFF |
| 10 | DD FFFFFF FFFFFF FF FFFFFF FFFFFF |
| 11 | FF FFFFFF FFFFFF DD FFFFFF FFFFFF |

Importantly, the four slot format combinations are applicable to two consecutive slots, for example, slot #j and slot #j+1. In other words, the slot format combinations specify for a total of 28 symbols whether each symbol is a downlink symbol, an uplink symbol or a flexible symbol. And with this definition of slot format combinations, there is no restriction that prevents consecutive slots from having different slot formats (see indexes '01' and '11' which define different slot formats for the two consecutive slots).

The (previously received) CORESET IE and Search Space IE configure the mobile terminal 110 such that it knows that from the first to fourth search space sets are located in resources corresponding to the first two symbols (i.e., symbols #1-#2) of each slot in the freq. ranges #1-#4, respectively. Importantly, the CORESET IE prescribes the first to fourth search space sets to be located in each separate slot, since the scheduling is performed wherein the slot format (i.e., the DCI format 2_0) is transmitted only every second slot as the notified slot format is applicable for two consecutive slots.

Now it is assumed that the base station 160 carries out Listen-Before-Talk operations, and accordingly performs (see Step S04 in FIG. 2) a clear carrier assessment for each of the freq. ranges #1-#4. In this example, it is again assumed that the clear channel assessment (CCA) performed by the base station 160 is successful on the first and third frequency ranges, and produces a failure for the second and fourth frequency range.

The mobile terminal 110 monitors (see step S06 of FIG. 2) physical downlink control channel, PDCCH, candidates of the first search space set located in the designated first frequency range, freq. range #1. The first search space set is a type 3 PDCCH common search space set, which is carrying DCIs that are scrambled with a slot format indicator, SFI, radio network temporary identifier, RNTI. Accordingly, the mobile terminal 110 monitors the first search space set for DCIs having DCI format 2_0. This is however only necessary every second slot.

The mobile terminal 110 then receives (see step S05 of FIG. 2) the downlink control information, DCI including an indication whether or not to skip monitoring PDCCH candidates. Particularly, the received DCI has a DCI format 2_0 which implies that it is used by the base station 160 to notify to the mobile terminal 110 the slot format to be used. Through the notification of specific slot formats to the mobile terminal 110, the base station 160 (also) transmits the indication whether or not to skip monitoring of PDCCH candidates.

In this example, the received DCI includes a sequences of slot format indicator, SFI, indexes for each of the freq. range #1-#4, where the SFI-Index for freq. range #1 corresponds to '00,' the SFI-Index for freq. range #2 corresponds to '01,' the SFI-Index for freq. range #3 corresponds to '00' and the SFI-Index for freq. range #4 corresponds to '01.' Then, the mobile terminal 110 uses the four SFI-Indexes to determine a slot formats for each one of the respective four frequency ranges. This determination references the respective slot format combinations of Table 4 for freq. ranges #1-#4.

Thus, the SFI-Index for freq. range #1 (and for freq. range #3) of '00' references the slot format DD FFFFFF FFFFFF DD FFFFFF FFFFFF. This means that the symbols #1-#2 and symbols #15-#16 in freq. range #1 (and freq. range #3) are downlink symbols, whereas remaining symbols are flexible symbols. Similarly, the SFI-Index for freq. ranges #2 and #4 of '01' references the slot format FF FFFFFF FFFFFF FF FFFFFF FFFFFF. This means that all symbols, including the symbols #1-#2 and symbols #15-#16 in freq. range #2 and #4 are flexible symbols.

Then, the mobile terminal 110 immediately identifies the discrepancy between the configured location of the PDCCH candidates in the second and fourth search space sets (i.e., symbols #1-#2 and symbols #15-#16) and the slot format indicated by the received DCI for the second and fourth freq. range #2 and #4.

Since the configured location of the second and fourth search space set are the symbols #1-#2 and symbols #15-#16 of the two consecutive slots in freq. ranges #2 and #4, the mobile terminal 110 would expect that these symbols were indicated as downlink symbols. However, the received DCI indicates these symbols as flexible symbols. In other words, there is a discrepancy between the configuration of search space sets and the notification of slot format for the freq. ranges #2 and #4.

Now, it is important to realize that this discrepancy is utilized by the base station 160 to transmit to the mobile terminal 110 the indication whether or not to skip monitoring of specific search space sets. In this example, the received DCI specifies a slot format with flexible symbols (i.e.: non-downlink symbols) at a location where the second and fourth search space set is configured. Thus, the mobile terminal 110 interprets this as an indication that the monitoring of PDDCH candidates of the second and fourth search space is skipped.

This indication is however, not restricted to the skipping the monitoring of PDCCH candidates only, but is also applicable to signaling an indication to skip physical downlink share channel, PDSCH, receptions, or physical uplink shared channel, PUSCH transmission.

In detail, the first two bits "00" tells the mobile terminal 110 to skip monitoring search space sets #2 and #4 in freq. ranges #2 and #4 of both consecutive slots. Further, the 3rd and 4th bits "01" tell the mobile terminal 110 to skip any data reception in freq. range #2. The 5th and 6th bits "00" tell the mobile terminal 110 to monitor the third search space set in freq. range #3 and potentially receive a PDSCH transmission in the subsequent symbols over resources in freq. range #3. And the 7th and 8th bits "00" tell the mobile terminal 110 to skip any data reception in freq. range #4.

For simplicity, the above example assumes DCI format 2_0 (SFI-PDCCH) is only transmitted in the first search space set. However, it should be understood that UE can be configured to monitor SFI-PDCCH in multiple search space sets and gNB then transmit SFI-PDCCH in those multiple search space set. In such case, the opportunity of getting SFI-PDCCH through CCA is higher, although the decoding effort for SFI-PDCCH in the UE side increases. If multiple SFI-PDCCH is transmitted, UE expects these SFI-PDCCHs transmitted in different frequency ranges are the same. Then, as long as one of them is decoded by the UE, the UE can skip receiving other SFI-PDCCHs. Alternatively, the UE is informed, e.g., in the slot format combination configuration, whether the UE expects the same or different SFI-PDCCHs in different frequency ranges. Then the UE can skip the rest of SFI-PDCCH which are configured to be the same.

EXAMPLE 3 FOR SPECIFIC IMPLEMENTATION

Now, with reference to FIG. 5 a third example is given for the specific implementation related to the 3GPP NR specific deployment scenario discussed above. For reasons of brevity, only those details are mentioned, which do not directly follow from the above discussion of FIG. 2.

In this example, it is assumed that the mobile terminal 110 receives for the freq. ranges #1-#4 (see step S03 in FIG. 2) a slot format combinations IE, which configures the mobile terminal 110 with a combination of eight different slot formats. This may result in the mobile terminal 110 being provided with an association between eight specific slot formats and eight index values which can be used in the selection operation for each of freq. ranges #1-#4. The association may be shown as in Table 4 below (with three indices reserved for future usage).

TABLE 5

Slot Format Combination for freq. ranges #1-#4

| Index value (for reference in DCI) | Slot format (one slot with 14symbols) |
| --- | --- |
| 000 | DD DDFFFF FFFFFF |
| 001 | DD DFFFFF FFFFFF |
| 010 | DD FFFFFF FFFFFF |
| 011 | DF FFFFFF FFFFFF |
| 100 | FF FFFFFF FFFFFF |
| 101, 110, 111 | reserved |

The (previously received) CORESET IE and Search Space IE configure the mobile terminal 110 such that it knows that the first and third search space sets are located in resources corresponding to the first two symbols (i.e., symbols #1-#2) of a slot in the freq. ranges #1 and #3 respectively. Similarly the mobile terminal 110 is configured such that it knows that the second and fourth search space sets are located in resources corresponding to the second and third symbol (i.e., symbols #2-#3) of a slot in in the freq. ranges #2 and #4, respectively.

In other words, in this configuration of the first and second search space set, and the third and fourth search space set are offset by a single symbol from each other with regard to their location in time domain in the respective freq. ranges #1-#4.

Now, it is assumed that the base station 160 carries out Listen-Before-Talk operations, and accordingly performs (see Step S04 in FIG. 2) a clear carrier assessment for each of the freq. ranges #1-#4. In this example, it is again assumed that the clear channel assessment (CCA) performed by the base station 160 is successful on the first and third frequency ranges, and produces a failure for the second and fourth frequency range.

The mobile terminal 110 monitors (see step S05 of FIG. 2) physical downlink control channel, PDCCH, candidates of the first search space set located in the designated first frequency range, freq. range #1. The first search space set is a type 3 PDCCH common search space set, which is carrying DCIs that are scrambled with a slot format indicator, SFI, radio network temporary identifier, RNTI. Accordingly, the mobile terminal 110 monitors the first search space set for DCIs having DCI format 2_0.

The mobile terminal 110 then receives (see step S06 of FIG. 2) the downlink control information, DCI including an indication whether or not to skip monitoring PDCCH candidates. Particularly, the received DCI has a DCI format 2_0 which implies that it is used by the base station 160 to notify to the mobile terminal 110 the slot format to be used. Through the notification of specific slot formats to the mobile terminal 110, the base station 160 (also) transmits the indication whether or not to skip monitoring of PDCCH candidates.

In this example, the received DCI includes a sequences of slot format indicator, SFI, indexes for each of the freq. range #1-#4, where the SFI-Index for freq. range #1 corresponds to '010,' the SFI-Index for freq. range #2 corresponds to '100,' the SFI-Index for freq. range #3 corresponds to '010' and the SFI-Index for freq. range #4 corresponds to '100.' Then, the mobile terminal 110 uses the four SFI-Indexes to determine a slot formats for each one of the respective four frequency ranges. This determination references the respective slot format combinations of Table 5 for freq. ranges #1-#4.

Thus, the SFI-Index for freq. range #1 (and for freq. range #3) of '010' references the slot format DD FFFFFF FFFFFF.

This means that the symbols #1-#2 in freq. range #1 (and freq. range #3) are downlink symbols, whereas remaining symbols are flexible symbols. Similarly, the SFI-Index for freq. ranges #2 and #4 of '100' references the slot format FF FFFFFF FFFFFF. This means that all symbols, including the symbols #2-#3 in freq. range #2 and #4 are flexible symbols.

Then, the mobile terminal 110 immediately identifies the discrepancy between the configured location of the PDCCH candidates in the second and fourth search space sets (i.e., symbols #2-#3) and the slot format indicated by the received DCI for the second and fourth freq. range #2 and #3.

Since the configured location of the second and fourth search space set are the symbols #2-#3 of the slots in freq. ranges #2 and #4, the mobile terminal 110 would expect that these symbols were indicated as downlink symbols. However, the received DCI indicates these symbols as flexible symbols. In other words, there is a discrepancy between the configuration of search space sets and the notification of slot format for the freq. ranges #2 and #4.

Now, it is important to realize that this discrepancy is utilized by the base station 160 to transmit to the mobile terminal 110 the indication whether or not to skip monitoring of specific search space sets. In this example, the received DCI specifies a slot format with flexible symbols (i.e.: non-downlink symbols) at a location where the second and fourth search space set is configured. Thus, the mobile terminal 110 interprets this as an indication that the monitoring of PDDCH candidates of the second and fourth search space is skipped.

This indication is however, not restricted to the skipping the monitoring of PDCCH candidates only, but is also applicable to signaling an indication to skip physical downlink share channel, PDSCH, receptions, or physical uplink shared channel, PUSCH transmission.

In detail, the first three bits "010" tells the mobile terminal 110 to skip monitoring search space sets #2 and #4 in the respective freq. ranges #2 and #4. Further, the 4th to 6th bits "100" tell the mobile terminal 110 to skip any data reception in freq. range #2. The 7th to 9th bits "010" tell the mobile terminal 110 to monitor the third search space set in freq. range #3 and potentially receive a PDSCH transmission in the subsequent symbols over resources in freq. range #3. And the 10th to 12th bits "100" tell the mobile terminal 110 to skip any data reception in freq. range #4.

It shall go without saying that in this third example, the slot format 000 can be used, e.g., if there is a 5th search space set, e.g., following SSs #3 in freq. range #3 that UE needs to monitor. Also, in the case where the mobile terminal receives indication of 010 for freq. range #2, this corresponds to the overlap mentioned above. In this case, the mobile terminal may be prescribed to (1) skip the all PDCCH candidates in SSs #2, or the mobile terminal may be prescribed to (2) only skip PDCCH candidates (in SSs #2) in the third symbol of the slot, but still monitors PDCCH candidates (in SSs #2) which are located in the second symbol of the slot.

The present disclosure can be realized by software, hardware, or software in cooperation with hardware. Each functional block used in the description of each embodiment described above can be partly or entirely realized by an LSI such as an integrated circuit, and each process described in the each embodiment may be controlled partly or entirely by the same LSI or a combination of LSIs. The LSI may be individually formed as chips, or one chip may be formed so as to include a part or all of the functional blocks. The LSI may include a data input and output coupled thereto. The LSI here may be referred to as an IC, a system LSI, a super LSI, or an ultra LSI depending on a difference in the degree of integration.

However, the technique of implementing an integrated circuit is not limited to the LSI and may be realized by using a dedicated circuit, a general-purpose processor, or a special-purpose processor. In addition, a FPGA (Field Programmable Gate Array) that can be programmed after the manufacture of the LSI or a reconfigurable processor in which the connections and the settings of circuit cells disposed inside the LSI can be reconfigured may be used. The present disclosure can be realized as digital processing or analogue processing. If future integrated circuit technology replaces LSIs as a result of the advancement of semiconductor technology or other derivative technology, the functional blocks could be integrated using the future integrated circuit technology. Biotechnology can also be applied.

According to a first aspect, a mobile terminal is disclosed for performing downlink receptions or uplink transmissions in a wireless communication system comprising a base station configured with a cell for wideband operation in an unlicensed spectrum with a carrier bandwidth which is divided into a plurality of frequency ranges.

The mobile terminal comprises a processor and a transceiver. The processor, in operation, monitors physical downlink control channel, PDCCH, candidates of a first search space set located in a designated first frequency range from the plurality of frequency ranges.

The transceiver, in operation, receives a downlink control information, DCI, transmitted in the first search space set of the designated first frequency range, wherein the received DCI includes an indication whether or not the mobile terminal is to skip monitoring some specific or all PDCCH candidates in at least one second search space set associated with at least one second frequency range from the plurality of frequency ranges.

And, only if the indication in the received DCI does not indicate to skip monitoring the specific or all PDCCH candidates in the at least one second search space set, the processor, in operation, additionally, monitors the specific or all PDCCH candidates associated with the at least one second frequency range for receiving a DCI including a downlink assignment which is assigning resources for downlink receptions or an uplink grant which is assigning resources for uplink transmissions.

According to a second aspect, which combines with the mobile terminal of the first aspect, the designated first frequency range is carrying at least one of a synchronization signal and physical broadcast channel block, SSB, a cell defining synchronization signal and physical broadcast channel block, cell defining SSB, reference signals for radio resource management, RRM, reference signals for radio link monitoring, RLM, and a hybrid automatic repeat request acknowledgement (HARQ-ACK).

According to a third aspect, which combines with the mobile terminal of the first or second aspect, at least the designated first frequency range from the plurality of frequency ranges has a predefined bandwidth, preferably 20 MHz.

According to a fourth aspect, which combines with the mobile terminal of the first to third aspects, the first search space set is a common search space set, optionally, the first search space set is a type 3 PDCCH common search space set, and further optionally, the first search space set is carrying DCIs scrambled with a slot format indicator, SFI, radio network temporary identifier, RNTI.

According to a fifth aspect, which combines with the mobile terminal of the first to fourth aspects, the first search space set is located in resources configured, in frequency domain, according to a control resource set, CORESET, of the mobile terminal, and the CORESET is defined for the mobile terminal via radio resource control, RRC, signaling, optionally, an RRC information element, IE, defining the control resource set, and further optionally, an RRC ControlResourceSet information element, IE, including the frequencyDomainResources field defining groups of six resource blocks which are fully contained in the resources within which the CORESET is configured.

According to a sixth aspect, which combines with the mobile terminal of the fifth aspect, the resources within which the CORESET is configured, correspond to, in frequency domain, at least one frequency range, and optionally the resources within which the CORESET is configured, correspond to, in frequency domain, exactly one frequency range.

According to a seventh aspect, which combines with the mobile terminal of the first to sixth aspects, the first search space set is located in resources configured, in time domain, via radio resource control, RRC, signaling, optionally, an RRC information element, IE, defining the search space including where to monitor PDCCH candidates, and further optionally, an RRC SearchSpace information element, IE, including the monitoringSymbolsWithinSlot field defining symbols for PDCCH monitoring in a slot.

According to an eighth aspect, which combines with the mobile terminal of the first to seventh aspects, each of the at least one second search space set is associated with one of the at least one second frequency range.

According to a ninth aspect, which combines with the mobile terminal of the first to eighth aspects, the transceiver, in operation, additionally, receives a configuration which pre-configures the mobile terminal with plural slot formats for at least one of the plurality of frequency ranges, preferably for all of the plurality of frequency ranges.

According to a tenth aspect, which combines with the mobile terminal of the ninth aspect, the configuration is received via radio resource control, RRC, signaling, optionally, at least one RRC information element, IE, specifying slot formats for at least one of, or preferably for all of the plurality of frequency range(s), further optionally, at least one RRC SlotFormatCombinations information element, IE, wherein each of the at least one RRC SlotFormatCombinations IE is separately pre-configuring slot formats for a respective one of the plurality of frequency ranges.

According to an eleventh aspect, which combines with the mobile terminal of the first to tenth aspects, the received DCI includes a separate slot format indicator, SFI, for each of the plurality of frequency ranges.

According to a twelfth aspect, which combines with the mobile terminal of the first to eleventh aspects, the received DCI is of DCI format 2_0, and, optionally, the received DCI of DCI format 2_0 includes a sequence of slot format indicator, SFI, index values which are to be interpreted differently for each of the plurality of frequency ranges, and, further optionally, each of the sequence of slot format indicator, SFI, index values is interpreted according to the separately pre-configured set of slot formats for the respective one of the plurality of frequency ranges.

According to a thirteenth aspect, which combines with the mobile terminal of the twelfth aspect, in case the indexed one of the pre-configured slot formats specifies a non-downlink symbol for resources in which the at least one second search space set is located, the processor, in operation, interprets the received DCI as including an indication that the mobile terminal is to skip monitoring some specific or all PDCCH candidates in the at least one second search space set associated with the respective one of the at least one second frequency range, and, preferably, wherein the non-downlink symbol is either an uplink symbol or a flexible symbol.

According to a fourteenth aspect, which combines with the mobile terminal of the first to thirteenth aspects, the specific PDCCH candidates for which the monitoring can be skipped, are located in resources, which share in time domain a same symbol or same set of symbols in the slot.

According to a fifteenth aspect, which combines with the mobile terminal of the first to fourteenth aspects, the plurality of frequency ranges are identified via: different listen-before-talk range identifiers, different mobile terminal specific frequency range identifiers, different control resource set, CORESET, identifiers, or different bandwidth part, BWP, indexes.

According to a sixteenth aspect, a method is disclosed for a mobile terminal to perform downlink receptions or uplink transmissions in a wireless communication system comprising a base station configured with a cell for wideband operation in an unlicensed spectrum with a carrier bandwidth which is divided into a plurality of frequency ranges.

The method comprises the steps of: monitoring physical downlink control channel, PDCCH, candidates of a first search space set located in a designated first frequency range from the plurality of frequency ranges, and receiving a downlink control information, DCI, transmitted in the first search space set of the designated first frequency range, wherein the received DCI includes an indication whether or not the mobile terminal is to skip monitoring some specific or all PDCCH candidates in at least one second search space set associated with at least one second frequency range from the plurality of frequency ranges.

And, only if the indication in the received DCI does not indicate to skip monitoring the specific or all PDCCH candidates in the at least one second search space set, the method comprises the step of additionally performing the step of monitoring the specific or all PDCCH candidates associated with the at least one second frequency range for receiving a DCI including a downlink assignment which is assigning resources for downlink receptions or an uplink grant which is assigning resources for uplink transmissions.

According to a seventeenth aspect, which combines with the method of the sixteenth aspect, the designated first frequency range is carrying at least one of a synchronization signal and physical broadcast channel block, SSB, a cell defining synchronization signal and physical broadcast channel block, cell defining SSB, reference signals for radio resource management, RRM, reference signals for radio link monitoring, RLM, and a hybrid automatic repeat request acknowledgement (HARQ-ACK).

According to a eighteenth aspect, which combines with the method of the sixteenth or seventeenth aspect, at least the designated first frequency range from the plurality of frequency ranges has a predefined bandwidth, preferably 20 MHz.

According to a nineteenth aspect, which combines with the method of the sixteenth to eighteenth aspects, the first search space set is a common search space set, optionally, the first search space set is a type 3 PDCCH common search space set, and further optionally, the first search space set is carrying DCIs scrambled with a slot format indicator, SFI, radio network temporary identifier, RNTI.

According to a twentieth aspect, which combines with the method of the sixteenth to nineteenth aspects, the first search space set is located in resources configured, in frequency domain, according to a control resource set, CORESET, of the mobile terminal, and the CORESET is defined for the mobile terminal via radio resource control, RRC, signaling, optionally, an RRC information element, IE, defining the control resource set, and further optionally, an RRC ControlResourceSet information element, IE, including the frequencyDomainResources field defining groups of six resource blocks which are fully contained in the resources within which the CORESET is configured.

According to a twenty-first aspect, which combines with the method of the twentieth aspect, the resources within which the CORESET is configured, correspond to, in frequency domain, at least one frequency range, and optionally the resources within which the CORESET is configured, correspond to, in frequency domain, exactly one frequency range.

According to a twenty-second aspect, which combines with the method of the sixteenth to twenty-first aspects, the first search space set is located in resources configured, in time domain, via radio resource control, RRC, signaling, optionally, an RRC information element, IE, defining the search space including where to monitor PDCCH candidates, and further optionally, an RRC SearchSpace information element, IE, including the monitoringSymbolsWithinSlot field defining symbols for PDCCH monitoring in a slot.

According to a twenty-third aspect, which combines with the method of the sixteenth to twenty-second aspects, each of the at least one second search space set is associated with one of the at least one second frequency range.

According to a twenty-fourth aspect, which combines with the method of the sixteenth to twenty-third aspects, the method comprises the step of additionally, receiving a configuration which pre-configures the mobile terminal with plural slot formats for at least one of the plurality of frequency ranges, preferably for all of the plurality of frequency ranges.

According to a twenty-fifth aspect, which combines with the method of the twenty-fourth aspect, the configuration is received via radio resource control, RRC, signaling, optionally, at least one RRC information element, IE, specifying slot formats for at least one of, or preferably for all of the plurality of frequency range(s), further optionally, at least one RRC SlotFormatCombinations information element, IE, wherein each of the at least one RRC SlotFormatCombinations IE is separately pre-configuring slot formats for a respective one of the plurality of frequency ranges.

According to a twenty-sixth aspect, which combines with the method of the sixteenth to twenty-fifth aspects, the received DCI includes a separate slot format indicator, SFI, for each of the plurality of frequency ranges.

According to a twenty-seventh aspect, which combines with the method of the sixteenth to twenty-sixth aspects, the received DCI is of DCI format 2_0, and, optionally, the received DCI of DCI format 2_0 includes a sequence of slot format indicator, SFI, index values which are to be interpreted differently for each of the plurality of frequency ranges, and, further optionally, each of the sequence of slot format indicator, SFI, index values is interpreted according to the separately pre-configured set of slot formats for the respective one of the plurality of frequency ranges.

According to a twenty-eighth aspect, which combines with the method of the twenty-seventh aspect, in case the indexed one of the pre-configured slot formats specifies a non-downlink symbol for resources in which the at least one second search space set is located, the method comprises the step of interpreting the received DCI as including an indication that the mobile terminal is to skip monitoring some specific or all PDCCH candidates in the at least one second search space set associated with the respective one of the at least one second frequency range, and, preferably, wherein the non-downlink symbol is either an uplink symbol or a flexible symbol.

According to a twenty-ninth aspect, which combines with the method of the sixteenth to twenty-eighth aspects, the specific PDCCH candidates, for which the monitoring can be skipped, are located in resources which share, in time domain, a same symbol or same set of symbols in the slot.

According to a thirtieth aspect, which combines with the method of the sixteenth to twenty-ninth aspects, the plurality of frequency ranges are identified via: different listen-before-talk range identifiers, different mobile terminal specific frequency range identifiers, different control resource set, CORESET, identifiers, or different bandwidth part, BWP, indexes.

The various embodiments described above can be combined to provide further embodiments. All of the U.S. patents, U.S. patent application publications, U.S. patent applications, foreign patents, foreign patent applications and non-patent publications referred to in this specification and/or listed in the Application Data Sheet are incorporated herein by reference, in their entirety. Aspects of the embodiments can be modified, if necessary to employ concepts of the various patents, applications and publications to provide yet further embodiments.

These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

The invention claimed is:

1. An integrated circuit comprising:
generation circuitry, which, in operation, controls generating a first downlink control information (DCI), the first DCI including control information indicating whether a communication apparatus skips monitoring a second DCI in respective ones of a plurality of frequency ranges; and
transmission circuitry, which, in operation, controls transmitting, to the communication apparatus, the first DCI in a first search space set and transmitting, to the communication apparatus, the second DCI in one or more second search space sets of one or more frequency ranges of the plurality of frequency ranges,
wherein the one or more frequency ranges to be not skipped are determined based on the control information.

2. The integrated circuit according to claim 1, wherein the first search space is a type 3 common search space.

3. The integrated circuit according to claim 1, wherein the first DCI is scrambled based on a slot format indicator (SFI)-radio network temporary identifier (RNTI) (SFI-RNTI).

4. The integrated circuit according to claim 1, wherein the first search space set in which the first DCI is mapped is a control resource set (CORESET), the CORESET being indicated by a radio resource control (RRC) signaling.

5. The integrated circuit according to claim 1, wherein the monitoring of the second DCI in frequency ranges other than the one or more frequency ranges is skipped.

6. The integrated circuit according to claim 1, wherein the plurality of frequency ranges are configured prior to the transmission of the first DCI.

7. The integrated circuit according to claim 1, wherein the plurality of frequency ranges have a same slot format which is configured by a radio resource control (RRC) signaling.

* * * * *